United States Patent
Gao et al.

(10) Patent No.: US 12,432,018 B2
(45) Date of Patent: Sep. 30, 2025

(54) CONFIGURED GRANT BASED PUSCH TRANSMISSION TO MULTIPLE TRPs

(71) Applicant: Telefonaktiebolaget LM Ericsson (publ), Stockholm (SE)

(72) Inventors: Shiwei Gao, Nepean (CA); Siva Muruganathan, Stittsville (CA); Yufei Blankenship, Kildeer, IL (US); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 18/032,853

(22) PCT Filed: Oct. 25, 2021

(86) PCT No.: PCT/IB2021/059847
§ 371 (c)(1),
(2) Date: Apr. 20, 2023

(87) PCT Pub. No.: WO2022/084976
PCT Pub. Date: Apr. 28, 2022

(65) Prior Publication Data
US 2023/0396373 A1    Dec. 7, 2023

Related U.S. Application Data

(60) Provisional application No. 63/104,812, filed on Oct. 23, 2020.

(51) Int. Cl.
*H04L 1/1867* (2023.01)
*H04L 1/1822* (2023.01)
(Continued)

(52) U.S. Cl.
CPC ............ *H04L 1/189* (2013.01); *H04L 1/1822* (2013.01); *H04L 1/1854* (2013.01); *H04L 1/1861* (2013.01); *H04W 72/21* (2023.01)

(58) Field of Classification Search
CPC ..... H04L 1/189; H04L 1/1822; H04L 1/1854; H04L 1/1861; H04L 2001/0093; H04L 1/1864; H04W 72/21
See application file for complete search history.

(56) References Cited

U.S. PATENT DOCUMENTS

2019/0174446 A1    6/2019   Zhang et al.
2020/0358557 A1*  11/2020   Park .................... H03M 13/618
(Continued)

FOREIGN PATENT DOCUMENTS

EP          3809602 A1      4/2021
WO       2019244207 A1     12/2019

OTHER PUBLICATIONS

Author Unknown, "Technical Specification Group Radio Access Network; NR; Physical layer procedures for control (Release 16)," Technical Specification 38.213, Version 16.3.0, Sep. 2020, 3GPP Organizational Partners, 179 pages.

(Continued)

*Primary Examiner* — Afshawn M Towfighi
(74) *Attorney, Agent, or Firm* — Withrow & Terranova, PLLC

(57) ABSTRACT

Systems and methods of the present disclosure are directed to a method performed by a wireless communication device. The method includes receiving, from a network node, information that configures the wireless communication device for a Configured Grant (CG) based Physical Uplink Shared Channel (PUSCH) transmission with PUSCH repetitions towards two or more transmissions/reception points (TRPs). The method includes performing the CG based PUSCH transmission with PUSCH repetitions towards the multiple TRPs in accordance with the received information.

43 Claims, 23 Drawing Sheets

(51) Int. Cl.
*H04L 1/1829* (2023.01)
*H04W 72/21* (2023.01)

(56) References Cited

U.S. PATENT DOCUMENTS

| | | | | |
|---|---|---|---|---|
| 2021/0184812 A1* | 6/2021 | MolavianJazi | ....... | H04W 72/23 |
| 2022/0287021 A1* | 9/2022 | Gao | ....................... | H04L 1/1896 |
| 2022/0368472 A1* | 11/2022 | Chen | ....................... | H04L 1/189 |
| 2023/0171769 A1* | 6/2023 | Chen | ....................... | H04L 1/1819 370/329 |
| 2024/0235737 A1* | 7/2024 | Li | ......................... | H04B 7/0456 |

OTHER PUBLICATIONS

Author Unknown, "Technical Specification Group Radio Access Network; NR; Physical layer procedures for data (Release 16)," Technical Specification 38.214, Version 16.3.0, Sep. 2020, 3GPP Organizational Partners, 166 pages.

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.

NTT Docomo, et al., "R1-1809979: Summary of 7.2.6.3 Enhanced UL grant-free transmission," 3GPP TSG RAN WG1 Meeting #94, Aug. 20-24, 2018, Gothenburg, Sweden, 20 pages.

NTT Docomo, et al., "R1-1906225: Discussion on multi-beam enhancement," 3GPP TSG RAN WG1 #97, May 13-17, 2019, Reno, Nevada, 24 pages.

Invitation to Pay Additional Fees and Partial Search for International Patent Application No. PCT/IB2021/059847, mailed Jan. 31, 2022, 9 pages.

International Search Report and Written Opinion for International Patent Application No. PCT/IB2021/059847, mailed Mar. 22, 2022, 19 pages.

Written Opinion for International Patent Application No. PCT/IB2021/059847, mailed Sep. 9, 2022, 7 pages.

International Preliminary Report on Patentability for International Patent Application No. PCT/IB2021/059847, mailed Jan. 19, 2023, 21 pages.

Office Action for Chilean Patent Application No. 202301164, mailed Nov. 8, 2024, 23 pages.

Result of Consultation for European Patent Application No. 21811132.6, mailed Mar. 4, 2024, 4 pages.

\* cited by examiner

An example of a CG with 4 repetitions towards two TRPs associated with beam #1 and beam #2.

An example of alternate TRP mapping in different CG periods.

FIG. 7

An example of allocation RVs separately for type B PUSCH repetitions associated to each TRP.

A second example of allocation RVs separately for type B PUSCH repetitions associated to each TRP.

An example of NR Rel-16 based frequency hopping with inter-repetition FH enabled for a CG with type B PUSCH repetition.

An example of per TRP based frequency hopping with inter-repetition FH enabled for a CG with type B PUSCH repetition.

FIG. 13

A second example of per TRP based frequency hopping with inter-repetition FH enabled for a CG with type B PUSCH repetition.

| repetition index: | 1 | 2 | 3 | 4 | 5 | 6 |
|---|---|---|---|---|---|---|
| corresponding TRP: | 1 | 2 | 1 | 2 | 1 | 2 |
| $m_1$ corresponding to TRP1 | 1 | 2 | 2 | 2 | 3 | 3 |
| $m_2$ corresponding to TRP2 | | 1 | | 2 | | 3 |

FIG. 14

Example showing per-TRP repetition indexing.

An example of overlapping DG-PUSCH overrides CG-PUSCH per TRP. (1) An overlapping DG-PUSCH with the same HARQ process ID as CG-PUSCH; (2) overlapping DG-PUSCH with different HARQ process ID as CG-PUSCH An example of two overlapping CG-PUSCH over two TRP. The higher-priority CG-PUSCH overrides lower-priority CG-PUSCH. The prioritization of higher-priority CG-PUSCH, and cancellation of lower-priority CG-PUSCH, is performed for each actual repetition individually.

CONFIGURED GRANT BASED PUSCH TRANSMISSION TO MULTIPLE TRPs

RELATED APPLICATIONS

This application is a 35 U.S.C. § 371 national phase filing of International Application No. PCT/IB2021/059847, filed Oct. 25, 2021, which claims the benefit of provisional patent application Ser. No. 63/104,812, filed Oct. 23, 2020, the disclosures of which are hereby incorporated herein by reference in their entireties.

TECHNICAL FIELD

The present disclosure relates to configured grant based Physical Uplink Shared Channel (PUSCH) transmission towards multiple Transmission/Reception Points (TRPs).

BACKGROUND

NR Frame Structure and Resource Grid

New Radio (NR) uses Cyclic Prefix Orthogonal Frequency Division Multiplexing (CP-OFDM) in both downlink (DL) (i.e., from a network node, gNB, or base station, to a user equipment (UE)) and uplink (UL) (i.e., from UE to gNB). Discrete Fourier Transform (DFT) spread Orthogonal Frequency Division Multiplexing (OFDM) is also supported in the uplink. In the time domain, NR downlink and uplink are organized into equally sized subframes of 1 millisecond (ms) each. A subframe is further divided into multiple slots of equal duration. The slot length depends on subcarrier spacing. For subcarrier spacing of $\Delta f=15$ kHz, there is only one slot per subframe, and each slot consists of 14 OFDM symbols.

Data scheduling in NR is typically in slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15 \times 2^\mu)$ kHz where $\mu \in \{0,1,2,3,4\}$. $\Delta f=15$ kHz is the basic subcarrier spacing. The slot durations at different subcarrier spacings is given by $$\frac{1}{2^\mu} \text{ ms.}$$

In the frequency domain, a system bandwidth is divided into Resource Blocks (RBs), each corresponds to twelve (12) contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one Resource Element (RE).

In NR Release 15, uplink data transmission can be dynamically scheduled using PDCCH. A UE first decodes uplink grants in PDCCH and then transmits data over PUSCH based the decoded control information in the uplink grant such as modulation order, coding rate, uplink resource allocation, etc.

In addition to dynamic scheduling, semi-persistent transmission of PUSCH using Configured Grants (CGs) is also supported in NR. There are two types of CG based PUSCH defined in NR Release 15. In CG type 1, a periodicity of PUSCH transmission as well as the time domain offset are configured by Radio Resource Control (RRC). In CG type 2, a periodicity of PUSCH transmission is configured by RRC and then the activation and release of such transmission is controlled by Downlink Control Information (DCI), i.e. with a PDCCH.

In NR, it is possible to schedule a PUSCH with time repetition, by the RRC parameter pusch-AggregationFactor (for dynamically scheduled PUSCH) and repK (for PUSCH with configured grant). In this case, a PUSCH is repeated in multiple adjacent slots (if the slot is available for UL) up until the number of repetitions configured.

For a configured grant, the redundancy version (RV) sequence to be used is configured by the repK-RV field when repetitions are used. If repetitions are not used for PUSCH, the repK-RV field is absent.

In NR Release 15, there are two PUSCH mapping types supported, Type A and Type B. Type A is usually referred to as slot-based while Type B transmissions may be referred to as non-slot-based or mini-slot-based. Mini-slot based PUSCH transmissions can be of any length for uplink and can start and end in any symbol within a slot. Note that mini-slot transmissions in NR Release 15 may not cross the slot-border.

One of the two frequency hopping modes, inter-slot and intra-slot frequency hopping, can be configured via higher layer for PUSCH transmission in NR Release 15 in Information Element (IE) PUSCH-Config for dynamic transmission or IE configuredGrantConfig for type1 and type2 CG.

In NR Release 16, PUSCH repetition enhancements were made for both PUSCH type A and type B for the purposes of further latency reduction (i.e., for Release 16 Ultra-Reliable Low-Latency Communication (URLLC)).

PUSCH Repetition Type A (Slot Based) Enhancements

In NR Release 15, the number of aggregated slots for both dynamic grant and configured grant Type 2 are RRC configured. In NR Release 16, slot-based repetition was enhanced so that the number of repetitions can be dynamically indicated, i.e. change from one PUSCH scheduling occasion to the next. That is, in addition to the starting symbol S and the length of the PUSCH L, a number of nominal repetitions K is signaled as part of the Time-Domain Resource Allocation (TDRA). Furthermore, the maximum number of aggregated slots was increased to K=16 to account for DL heavy Time Division Duplexing (TDD) patterns.

For both Type 1 and Type 2 PUSCH transmissions with a configured grant, when K>1, the UE shall repeat the Transport Block (TB) across the K consecutive slots applying the same symbol allocation in each slot.

A Type 1 or Type 2 PUSCH transmission with a configured grant in a slot is omitted according to the conditions in Clause 9, Clause 11.1 and Clause 11.2A of 3GPP Technical Specification (TS) 38.213. Thus, the number of repetitions K is nominal since some slots may be DL slots and are then skipped for PUSCH transmissions.

Additionally, it should be noted that inter-slot and intra-slot hopping can be applied for Type A repetition.

PUSCH Repetition Type B (Mini-Slot Based) Enhancements

PUSCH repetition Type B applies both to dynamic and configured grants. Additionally, however, type B PUSCH repetition can now cross the slot boundary in Release 16. When scheduling a transmission with PUSCH repetition Type B, in addition to the starting symbol S and the length of the PUSCH L, a number of nominal repetitions K is signaled as part of the TDRA in NR Release 16. To determine the actual time domain allocation of Type B PUSCH repetitions, a two-step process is used:

1. Allocate K nominal repetitions of length L back-to-back (e.g., adjacent in time), ignoring slot boundaries and TDD pattern.
2. If a nominal repetition crosses a slot boundary or occupies symbols not usable for UL transmission (e.g., UL/DL switching points due to TDD pattern), the offending nominal repetition may be split into two or more shorter actual repetitions. If the number of potentially valid symbols for PUSCH repetition type B transmission is greater than zero for a nominal repetition, the nominal repetition consists of one or more actual repetitions, where each actual repetition consists of a consecutive set of potentially valid symbols that can be used for PUSCH repetition Type B transmission within a slot.

An example in which a nominal repetition crosses a slot boundary is shown in FIG. 3. Four nominal repetitions are allocated back-to-back, starting in slot 1 and continuing in slot 2. The second nominal repetition crosses the slot border and is split into two actual repetitions.

Each repetition contains Demodulation Reference Signal (DMRS), with the position of the DMRS in each repetition following NR Release 15 rules.

Additionally, it should be noted that inter-slot frequency hopping and inter-repetition frequency hopping can be configured for Type B repetition.

Redundancy Version

For channels (e.g., physical channels), the channel encoder can be controlled by the Redundancy Version (RV). In NR, an information payload can be encoded with four different RVs (i.e., RV=0,1,2,3) to allow for incremental redundancy decoding. For PUSCH repetition Type A and Type B with a configured grant, the higher layer parameter repK-RV defines the redundancy version pattern/sequence to be applied to the repetitions. If the parameter repK-RV is not provided in the configuredGrantConfig, the redundancy version for uplink transmissions with a configured grant shall be set to 0.

For PUSCH repetition Type A with a configured grant, if the parameter repK-RV is provided in the configuredGrantConfig, for the nth transmission occasion among K repetitions, n=1, 2, . . . , K, it is associated with (mod(n−1,4)+1)th value in the configured RV sequence.

For PUSCH repetition Type B with a configured grant, if the parameter repK-RV is provided in the configuredGrantConfig, for the nth transmission occasion among all the actual repetitions (including the actual repetitions that are omitted) of the K nominal repetitions, it is associated with (mod(n−1,4)+1)th value in the configured RV sequence.

If a configured grant configuration is configured with startingFromRV0-r16 set to 'off', the initial transmission of a transport block may only start at the first transmission occasion of the actual repetitions. Otherwise, the initial transmission of a transport block may start at:

the first transmission occasion of the actual repetitions if the configured RV sequence is {0,2,3,1}, any of the transmission occasions of the actual repetitions that are associated with RV=0 if the configured RV sequence is {0,3,0,3}, any of the transmission occasions of the actual repetitions if the configured RV sequence is {0,0,0,0}, except the actual repetitions within the last nominal repetition when K≥8.

Spatial Relation Definition

Spatial relation is used in NR to refer to a relationship between an UL Reference Signal (RS) to be transmitted such as PUCCH/PUSCH DMRS and another previously transmitted or received RS, which can be either a DL RS (Channel State Information Reference Signal (CSI-RS), a Synchronization Signal Block (SSB)) or an UL RS (Sounding Reference Signal (SRS)). This is also defined from a UE perspective.

If an UL transmitted RS is spatially related to a DL RS, it means that the UE should transmit the UL RS in the opposite (reciprocal) direction from which it received the DL RS previously. More precisely, the UE should apply the "same" Transmit (Tx) spatial filtering configuration for the transmission of the UL RS as the Rx spatial filtering configuration it used to receive the spatially related DL RS previously. Here, the terminology 'spatial filtering configuration' may refer to the antenna weights that are applied at either the transmitter or the receiver for data/control transmission/reception. Another way to describe this is that the same "beam" should be used to transmit the signal from the UE as was used to receive the previous DL RS signal. The DL RS is also referred as the spatial filter reference signal.

On the other hand, if a first UL RS is spatially related to a second UL RS, then the UE should apply the same Tx spatial filtering configuration for the transmission for the first UL RS as the Tx spatial filtering configuration the UE used to transmit the second UL RS previously. In other words, the same beam is used to transmit the first and second UL RS respectively.

Since the UL RS is associated with a layer of PUSCH or PUCCH transmission, it is understood that the PUSCH/PUCCH is also transmitted with the same TX spatial filter as the associated UL RS.

In NR, there are two transmission schemes specified for PUSCH: Codebook based PUSCH and Non-Codebook based PUSCH.

Codebook Based PUSCH

The Codebook based UL transmission is used on both NR and LTE and was motivated to be used for non-calibrated UEs and/or Frequency Division Duplexing (FDD). Codebook based PUSCH in NR is enabled if higher layer parameter txConfig=codebook. For dynamically scheduled PUSCH and configured grant PUSCH type 2, the Codebook based PUSCH transmission scheme can be summarized as follows:

The UE transmits one or two SRS resources (i.e., one or two SRS resources configured in the SRS resource set associated with the higher layer parameter usage of value 'CodeBook').

The gNB determines a preferred Multiple Input Multiple Output (MIMO) transmit precoder for PUSCH (i.e., transmit precoding matrix indicator (TPMI)) from a codebook and the associated number of layers corresponding to the one or two SRS resources.

The gNB indicates a selected SRS resource via a 1-bit 'SRS resource indicator' field if two SRS resources are configured in the SRS resource set. The 'SRS resource indicator' field is not indicated in DCI if only one SRS resource is configured in the SRS resource set.

The gNB indicates a TPMI and the associated number of layers corresponding to the indicated SRS resource (in case two SRS resources are used) or the configured SRS resource (in case of one SRS resource is used). TPMI and the number of PUSCH layers is indicated by the ' Precoding information and number of layers' field in DCI formats 0_1 and 0_2. The UE performs PUSCH transmission using the TPMI and number of layers indicated.

For configured grant PUSCH type 1, SRI and TPMI are configured in configuredGrantConfig.

Non-Codebook Based PUSCH

Non-Codebook based UL transmission is available in NR, enabling reciprocity-based UL transmission. By assigning a DL CSI-RS to the UE, it can measure and deduce suitable precoder weights for PUSCH transmission of up to four spatial layers. The candidate precoder weights are transmitted using up to four single-port SRS resources corresponding to the spatial layers. Subsequently, the gNB indicates the transmission rank and multiple SRS Resource Indicators (SRIs), jointly encoded using $$\left\lceil \log_2 \left( \Sigma_{k=1}^{min\{L_{max}, N_{SRS}\}} \binom{N_{SRS}}{k} \right) \right\rceil \text{ bits,}$$

where $N_{SRS}$ indicates the number of configured SRS resources, and $L_{max}$ is the maximum number of supported layers for PUSCH. For dynamically scheduled PUSCH, SRI(s) are indicated in the corresponding DCI. For configured grant PUSCH type 2, SRI(s) are indicated in the corresponding DCI activating the CG.

Finally, for configured grant PUSCH type 1, SRI(s) are configured in configuredGrantConfig.

SUMMARY

In some embodiments, a method performed by a wireless communication device is proposed. The method includes receiving, from a network node, information that configures the wireless communication device for a Configured Grant (CG) based Physical Uplink Shared Channel (PUSCH) transmission with PUSCH repetitions towards a first and a second transmissions/reception points (TRPs), wherein the first and second TRPs are respectively associated with first and second Sounding Reference Signal (SRS) resource set. The method includes performing the CG based PUSCH transmission with PUSCH repetitions towards the first and second TRPs at different PUSCH transmission occasions in accordance with the received information.

In some embodiments, the information that configures the wireless communication device further includes a single Redundancy Version (RV) sequence configured for both of the two TRPs, wherein the RV sequence consists of four RV values comprising RV1, RV2, RV3, and RV4 and an RV offset to be applied to the second TRP, wherein the RV offset includes one of 0, 1, 2, or 3. The RV sequence is to be applied to PUSCH repetitions towards the first TRP starting with RV1 in the RV sequence to the first PUSCH transmission occasion to the first TRP, and the RV sequence is to be applied to PUSCH repetitions towards the second TRP starting with a RV in the RV sequence indicated by the RV offset to the first PUSCH transmission occasion to the second TRP.

In some embodiments, the PUSCH repetitions are either type A repetitions that occur in consecutive slots or type B repetitions that occur in consecutive mini-slots, wherein a mini-slot includes a number of consecutive symbols, wherein a transmission occasion for type A repetition starts at the first symbol in a slot and has a duration of 4 to 14 consecutive symbols, and wherein a transmission occasion for type B repetition starts from any symbol in a slot and has a duration of 1 to 14 consecutive symbols.

In some embodiments, the PUSCH repetitions are nominal repetitions in case of type B repetition and a subset of the nominal repetitions are associated with each of the first TRP and the second TRP. Actual repetitions associated with the subset of nominal repetitions for each TRP are counted starting from a first actual repetition of the actual repetitions. For an nth transmission occasion among the actual repetitions of the subset of nominal repetitions associated with the second TRP, the nth transmission occasion is associated with an $(\mod(n-1+RV\_offset, 4)+1)^{th}$ value in the single configured RV sequence, wherein n is a positive integer.

In some embodiments, the CG based PUSCH transmission is initiated at a transmission occasion of a PUSCH repetition associated with a RV value of 0.

In some embodiments, the CG based PUSCH transmission is a type A PUSCH repetition comprising transmission occasions in consecutive slots.

In some embodiments, the CG based PUSCH transmission is a type B mini-slot based PUSCH repetition comprising transmission occasions that occur (a) across two consecutive slots, or (b) in one slot.

In some embodiments, the first and second TRPs are mapped to different CG PUSCH repetition occasions.

In some embodiments, RV allocation for the CG based PUSCH transmission is per TRP.

In some embodiments, the CG based PUSCH transmission uses per TRP based frequency hopping.

In some embodiments, the received information includes per TRP configuration information comprising one or more of:
(a) SRS resource indicator;
(b) pathloss reference signal index;
(c) power control parameters: p0-PUSCH-Alpha;
(d) Closed-loop power control loop index to use;
(e) Number of layers and precoding configuration information;
(f) RV sequence; or
(g) any two or more of (a)-(e).

In some embodiments, the method further includes sending, to the network node, information that indicates a capability of the wireless communication device for uplink panel switching time for CG beam updates.

In some embodiments, the first and second TRPs are cyclically mapped to CG PUSCH repetition occasions, wherein odd numbered occasions are mapped to the first TRP and even numbered occasions are mapped to the second TRP, and wherein the repetitions are nominal repetitions in case of type B PUSCH repetition.

In some embodiments, the first and second TRPs are sequentially mapped to CG PUSCH repetition occasions, wherein $(4n-3, 4n-2)^{th}$ occasions where n is a positive integer are mapped to the first TRP and remaining repetitions are mapped to the second TRP, and wherein the repetitions are nominal repetitions in case of type B PUSCH repetition.

In some embodiments, the CG based PUSCH transmission uses per TRP based RV to CG PUSCH repetition occasion mapping in which either (a) nominal repetition occasions associated to each TRP or (b) actual repetition occasions associated to each TRP are indexed independently.

In some embodiments, for each nominal or actual repetition occasion, an index of the nominal or actual repetition occasion is mapped to a configured RV sequence.

In some embodiments, either (a) a same RV sequence or (b) different RV sequences are configured for each TRP from among the two TRPs.

In some embodiments, the CG based PUSCH transmission uses per TRP based frequency hopping in which a frequency hopping sequence is applied to PUSCH repetition occasions associated with each TRP independently.

In some embodiments, (a) either nominal repetition occasions associated with each TRP or (b) actual PUSCH repetition occasions associated with each TRP are indexed independently. An index of each nominal or actual PUSCH repetition occasion is used to determine a starting location.

In some embodiments, the starting location includes a Resource Block (RB) of a frequency or a frequency hopping pattern.

In some embodiments, one or more CG PUSCH repetition occasions that collide with one or more dynamically scheduled PUSCHs are dropped.

In some embodiments, the CG is either RRC configured or dynamically activated.

In some embodiments, the information that configures the wireless communication device includes RRC parameters, wherein the RRC parameters include two powerControlLoopToUse parameters and two p0-PUSCH-Alpha parameters.

In some embodiments, the CG includes a RRC configured type 1 CG, and wherein the information that configures the wireless communication device includes RRC parameters, wherein the RRC parameters further include:
(a) two pathlossReferenceIndex parameters;
(b) two srs_resourceIndicator parameters; and
(c) two precodingAndNumberOfLayers parameters.

In some embodiments, the CG includes a dynamically activated type 2 CG.

In some embodiments, prior to performing the CG based PUSCH transmission, the method includes receiving, from the network node, downlink control information, DCI, for activation of the CG based PUSCH transmission with PUSCH repetitions, wherein the DCI is indicative of (a) two SRS Resource Indicators, SRS RIs, and (b) two Transmit Precoding Matrix Indices (TPMI) in case of codebook based PUSCH.

In some embodiments, a first powerControlLoopToUse parameter of the two powerControlLoopToUse parameters and a first p0-PUSCH-Alpha parameter of the two p0-PUSCH-Alpha parameters are associated with the first SRS resource set. A second powerControlLoopToUse parameter of the two powerControlLoopToUse parameters and a second p0-PUSCH-Alpha parameter of the two p0-PUSCH-Alpha parameters are associated with the second SRS resource set.

In some embodiments, the DCI includes a parameter that indicates, to the wireless communication device, to apply:
(a) the first powerControlLoopToUse parameter;
(b) the second powerControlLoopToUse parameter;
(c) the first p0-PUSCH-Alpha parameter;
(d) the second p0-PUSCH-Alpha parameter; or
(e) any two or more of (a)-(d).

In some embodiments, A DCI for a dynamic scheduled (DG) PUSCH transmission is further received via a Physical Downlink Control Channel (PDCCH). The PUSCH repetitions are associated to a different Hybrid Automatic Repeat Request (HARQ) process Identifier (ID) than the dynamically scheduled PUSCH, wherein a particular one or more of the PUSCH repetitions collide with the dynamically scheduled PUSCH, and wherein, as a result, the one or more PUSCH repetitions are dropped.

In some embodiments, the PUSCH repetitions are associated to a same HARQ process Identifier ID as one or more dynamically scheduled PUSCHs, wherein a particular one of the PUSCH repetitions collides with the one or more dynamically scheduled PUSCHs, and wherein, as a result, the particular one of the PUSCH repetitions occasions and all remaining PUSCH repetition occasions associated to the same HARQ ID are dropped.

In some embodiments, the CG based PUSCH transmission includes PUSCH repetitions towards the first and second TRPs in each of two or more transmission periods.

In some embodiments, the first and second TRPs are indicated by either (a) two different SRS resource indicators (SRIs) or (b) two UL Transmission Configuration Indicator TCI states included in the received information.

In some embodiments, wherein a mapping between the CG PUSCH repetition occasions and the first and second TRPs changes in different time periods.

In some embodiments, each of the first and second TRPs is associated with a subset of nominal PUSCH repetitions. Actual PUSCH repetitions associated with the subset of nominal PUSCH repetitions for each TRP are counted. For an nth transmission occasion in which n is a positive integer among the actual repetitions of the subset of nominal repetitions associated with the first TRP, the nth transmission occasion is associated with an (mod(n−1,4)+1)th RV value in a configured RV sequence for the TRP, wherein the RV sequence includes 4 RV values {RV1, RV2,RV3,RV4}.

In some embodiments, for each TRP from among the two TRPs, the TRP is associated with a subset of actual repetitions, and an nth transmission occasion among the actual repetitions is associated with an (mod(n−1,4)+1)th value in a configured RV sequence for the TRP.

In some embodiments, the received information includes information that configures different RV sequences for different TRPs.

In some embodiments, the received information includes information that configures a same RV sequence and different RV offsets for the two TRPs.

In some embodiments, CG PUSCH transmission uses a same frequency hopping pattern for each TRP of the two TRPs.

In some embodiments, CG PUSCH transmission uses different frequency hopping patterns for the two TRPs.

In some embodiments, a same Uplink Control Information (UCI) is multiplexed with the PUSCH transmission towards each of the two TRPs.

In some embodiments, the CG PUSCH transmission has a first priority and overlaps in time with a second CG PUSCH transmission with repetitions having a second priority, and a lower priority one of the CG PUSCH transmission and the second CG PUSCH transmission is cancelled before a start of a higher priority one of the CG PUSCH transmission and the second PUSCH transmission.

In some embodiments, the CG PUSCH transmission has a first priority and overlaps in time with a second CG PUSCH transmission with repetitions having a second priority, and repetitions of a lower priority one of the CG PUSCH transmission and the second CG PUSCH transmission that collide with repetitions of a higher priority one of the CG PUSCH transmission and the second PUSCH transmission are cancelled.

In some embodiments, the received information includes information that updates one or more activated beams used by the wireless communication device for CG PUSCH transmission with repetitions, and the wireless communication device applies the updates only after a predefined or configured timer expires In some embodiments, the predefined or configured timer is based at least in part on a reported value by the wireless communication device.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 illustrates an example for configuration of separate RV sequences for each TRP, in which a type B PUSCH repetition with S=4, L=4, K=4 towards two TRPs is configured;

Figures 9, 10:
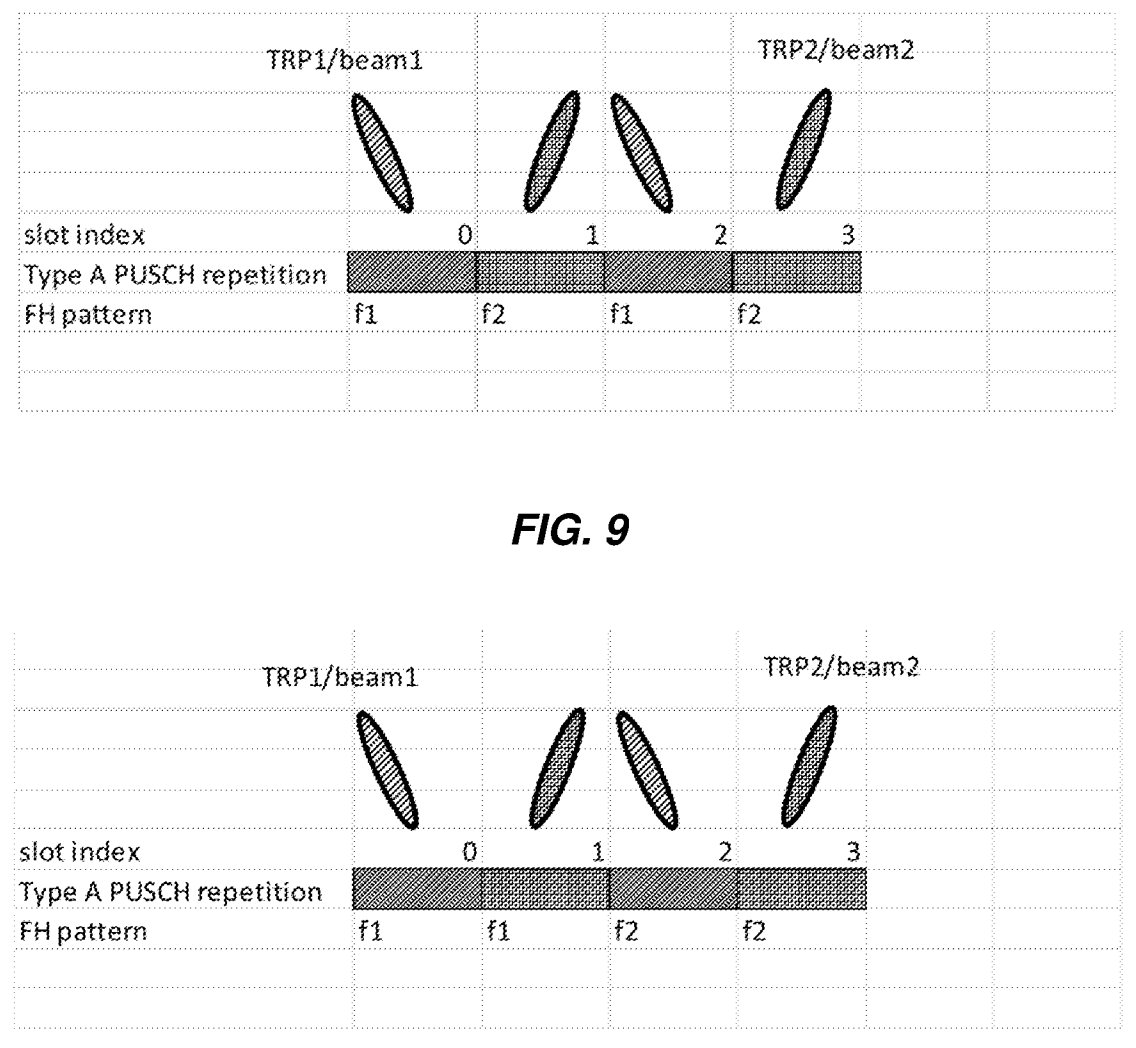

FIG. 9 illustrates an example TRP frequency hopping, where f1 and f2 are the starting RBs;

FIG. 10 illustrates an example TRP frequency hopping where the starting RBs (denoted as f1 and f2) changes in a per TRP basis;

FIG. 13 illustrates an example of frequency hopping in which the same Configuration Grant (CG) as that illustrated in FIG. 11 is used, but FH is performed in a per TRP basis and FH is applied to each subset of actual repetitions separately;

FIG. 14 illustrates an example of how repetition indices m1 and m2 are related to different PUSCH repetitions;

DETAILED DESCRIPTION

Figure 1:
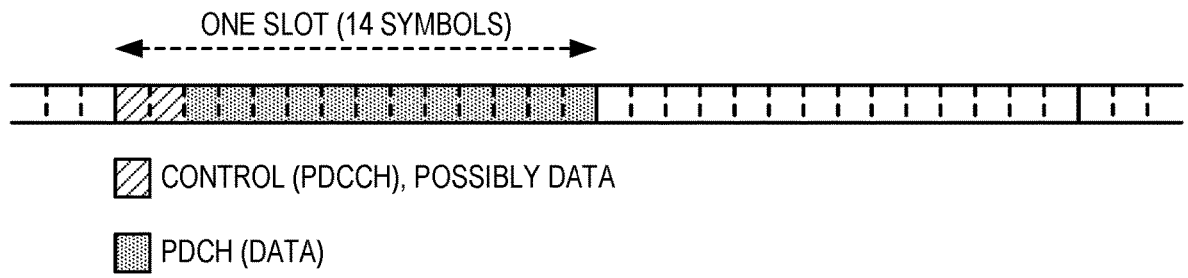
FIG. 1 depicts an example of a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH)
Figure 2:
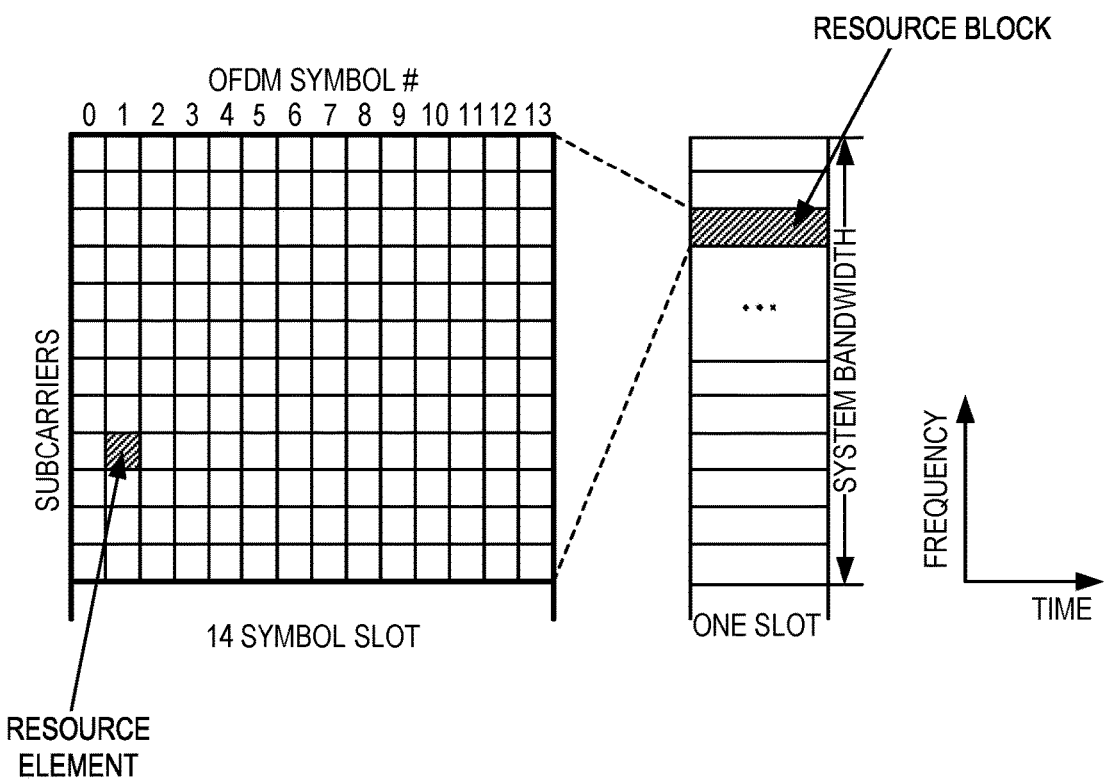
FIG. 2 illustrates an example of a basic New Radio (NR) physical time-frequency resource grid in which only one Resource Block (RB) within a 14-symbol slot is shown.
Figure 3:
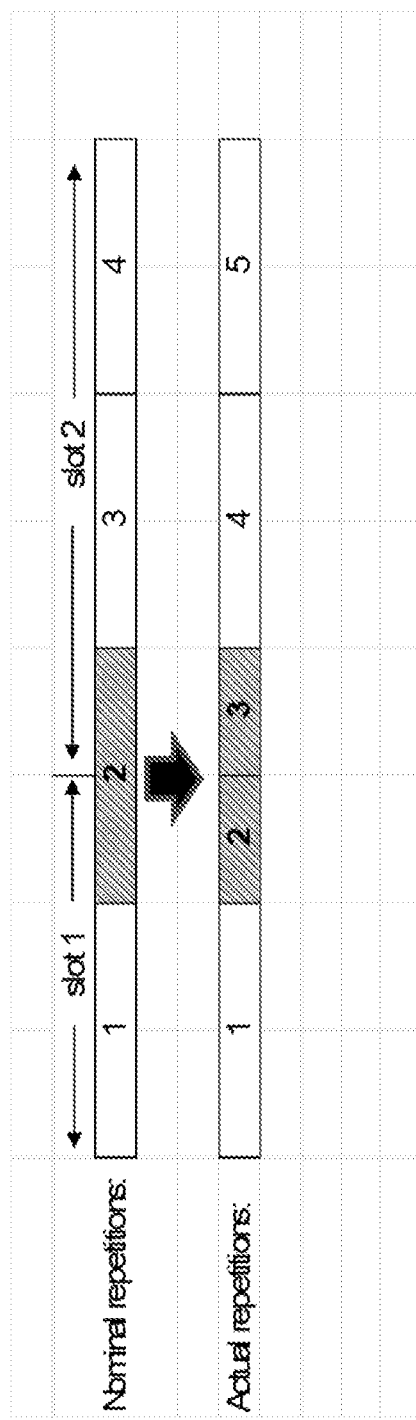
FIG. 3 illustrates an example in which a nominal repetition crosses a slot boundary.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. In some embodiments, in Multiple Transmit/Receive Point (multi-TRP) operation, a serving cell can schedule a UE to transmit signals or channels towards two TRPs, providing better uplink coverage, reliability and/or data rates. A TRP may be represented or indicated by a spatial relation, an SRS resource set, an SRS resource indicator, or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). When multiple Transmission/Reception Points (TRPs) are deployed to improve Physical Uplink Shared Channel (PUSCH) diversity to combat channel blocking in Frequency Range 2 (FR2), it is desirable to be able to send a PUSCH to different TRPs so that, when one TRP is blocked, the PUSCH can still be received from other unblocked TRPs. In existing Configuration Grant (CG)-based PUSCH transmission with PUSCH repetitions, the PUSCH repetitions for a given CG can be transmitted towards only a single TRP. As such, the question of how to transmit PUSCH associated with a CG towards multiple TRPs is a problem.

Certain aspects of the present disclosure and their embodiments may provide solutions to the aforementioned or other challenges. Embodiments of systems and methods are disclosed herein for transmitting CG based slot-based (e.g., Type A) and mini-slot based (e.g., Type B) PUSCH repetitions to multiple TRPs. Embodiments disclosed herein include one or more of the following aspects:

- Mapping different TRPs to different CG PUSCH transmission occasions,
- Per TRP based RV allocation to CG PUSCH transmission occasions,
- Per TRP based frequency hopping patterns,
- Other per TRP configuration such as Modulation and Coding Scheme (MCS), resource allocation, Redundancy Version (RV) sequence, layer and precoding,
- Collision handling between CG PUSCH occasion and dynamically scheduled PUSCH (e.g., dynamically activated) as well as collision between different CGs with different priorities,
- UE capability signaling on Uplink (UL) panel switching time for CG beam updates.

Specifically, some methods of CG based PUSCH repetition towards multiple TRPs of the present disclosure may be directed to one or more of the following aspects:

- Utilization of cyclic or sequential TRP to CG PUSCH repetition occasion mapping based on nominal PUSCH repetition occasions and the switch positions of the TRPs in two adjacent CG periods,
- Utilization of per TRP based RV to PUSCH repetition occasion mapping in which either the nominal or actual repetition occasions associated with each TRP are indexed independently. The index is used to look up a configured RV sequence (e.g., mapped to a configured RV sequence). Either a same or different RV sequences may be configured for each TRP. In case a same RV sequence is configured, a RV offset (e.g., a different RV offset) may be configured for each TRP.

Provision of per TRP based Frequency Hopping (FH) in which FH is applied to PUSCH repetition occasions associated with each TRP independently. Either the nominal or actual repetition occasions associated with each TRP are indexed independently. The index is used to determine a start Resource Block (RB) (e.g., a starting location such as an RB, frequency, frequency hopping pattern, etc.)). For type A repetition, the slot indices associated with each TRP may be used to determine the starting RB.

Enable CG parameter configuration such that one or more of the following CG parameters may be configured separately for each TRP:

mcsAndTBS (e.g., a parameter for Modulation and Coding Scheme (MCS) and Transport Block Size (TBS), etc.)

frequencyDomainAllocation (e.g., a parameter for Frequency domain resource allocation, etc.)

precodingAndNumberOfLayers antennaPort pathlossReferenceIndex powerControlLoopToUse p0-PUSCH-Alpha repK-RV (e.g., a RV pattern or sequence to be applied, etc.)

srs-ResourceIndicator

Enable repetition such that, in case of collision between CG PUSCH occasion(s) and a dynamically scheduled PUSCH, the CG PUSCH occasion(s) are dropped (e.g., the CG PUSCH occasion(s) that collide). If a same Hybrid Automatic Repeat Request (HARQ) process ID is used, the remaining CG PUSCH repetition occasions are also dropped.

Enable beam updates such that, for updating beams used for a CG, a UE capability on beam/UL panel switching time is signaled to the gNB.

Enable repetition such that the CG can be either type 1 or type 2, and the PUSCH repetition can be type A or Type B PUSCH repetition.

There are, proposed herein, various embodiments which address one or more of the issues disclosed herein.

Certain embodiments may provide one or more of the following technical advantage(s). The proposed methods enables CG PUSCH transmission to multiple TRPs with better diversity in presence channel blocking. More specifically, the proposed methods enable more even distribution of PUSCH transmission occasions across TRPs and better frequency domain diversity within each TRP through per TRP based frequency hopping, thus enabling soft combining at each TRP through per TRP based RV allocation and better link adaptation through per TRP MCS and frequency domain resource allocation.

Figure 4A:
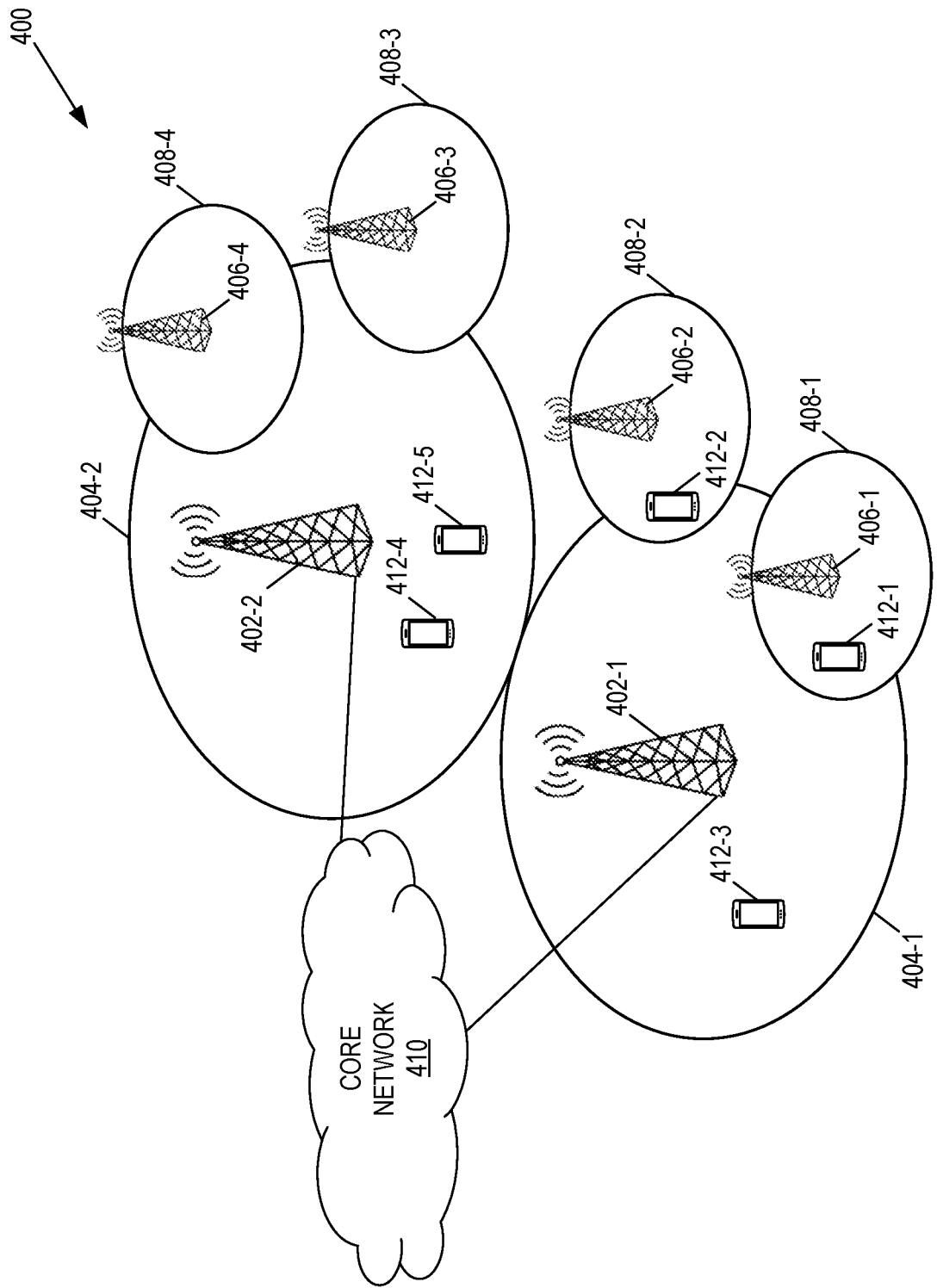
FIG. 4A illustrates one example of a cellular communications system in which embodiments of the present disclosure may be implemented.

FIG. 4A illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC); however, the solutions described herein are not limited thereto. In this example, the RAN includes base stations 402-1 and 402-2, which in the 5GS include NR base stations (gNBs) and optionally next generation eNBs (ng-eNBs) (e.g., LTE RAN nodes connected to the controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

It should be noted that the terms "repetition and "repetition occasion" are used through the present disclosure. As discussed, a repetition (e.g., a PUSCH repetition) is transmitted in a repetition occasion (e.g., PUSCH repetition occasion) or transmission occasion (e.g., PUSCH transmission occasion), and as such, "repetition occasion" and "transmission occasion" may be used interchangeably throughout the text.

Figure 4B:
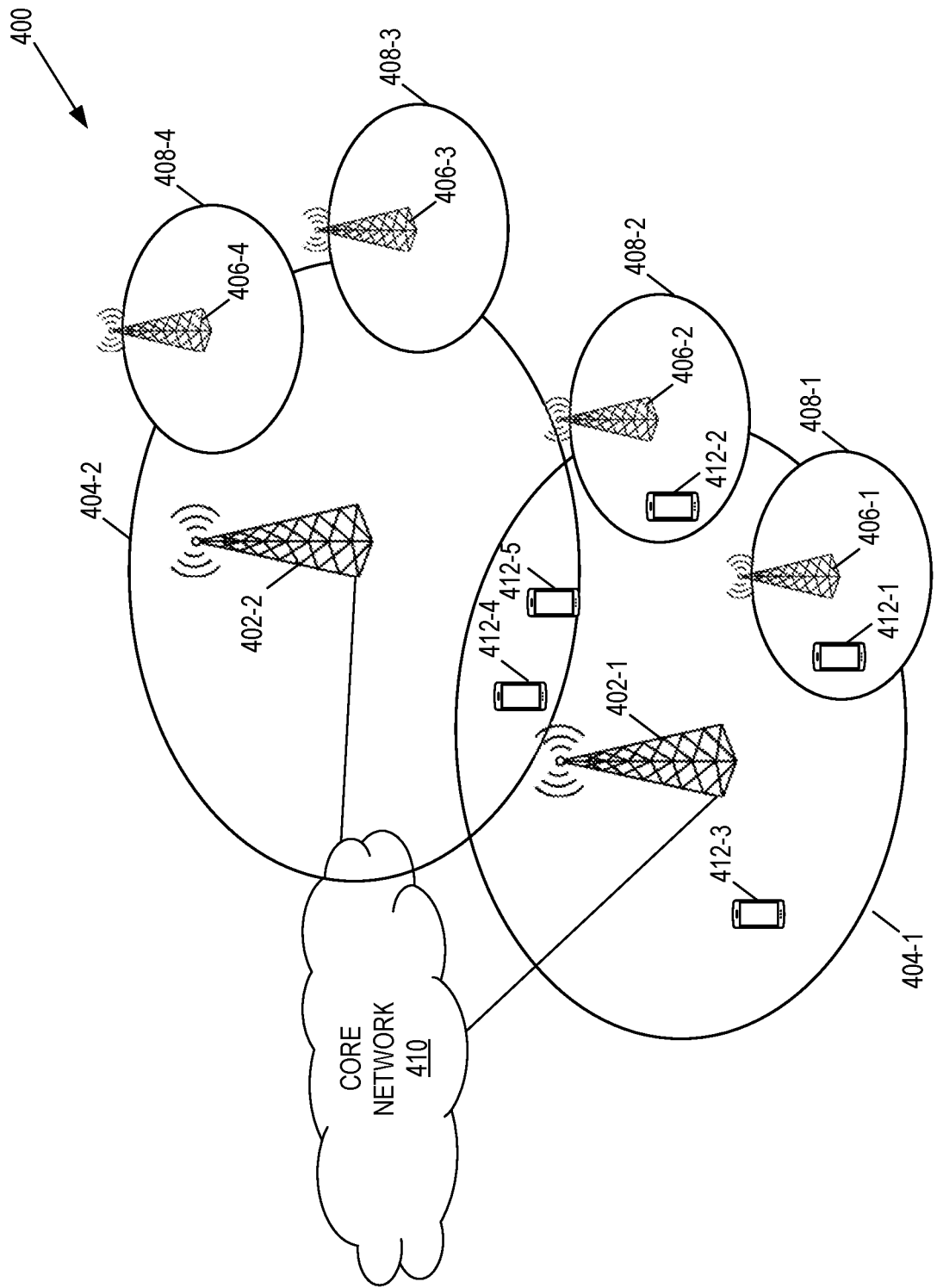
FIG. 4B illustrates an example of node overlap within the cellular communications system 400 of FIG. 4A according to some embodiments of the present disclosure.

FIG. 4B illustrates an example of node overlap within the cellular communications system 400 of FIG. 4A according to some embodiments of the present disclosure. Specifically, FIG. 4B illustrates example positioning of wireless communication devices described throughout the present disclosure. For example, wireless communication devices 412-4 and 412-5 are positioned within the range of two nodes 402-1 and 402-2 (e.g., TRPs, etc.). The wireless communication devices within the range of the two nodes can perform CG based PUSCH transmission with PUSCH repetitions towards the first node 402-1 (e.g., first TRP) and the second node 402-2 (e.g., second TRP) at different PUSCH transmission occasions in accordance with the embodiments described throughout the present disclosure. Now, a description of various embodiments relating to multiple aspects of the solutions herein will be described.

I. Transmitting PUSCH of Configured Grant to Multiple TRPs

Figure 5:
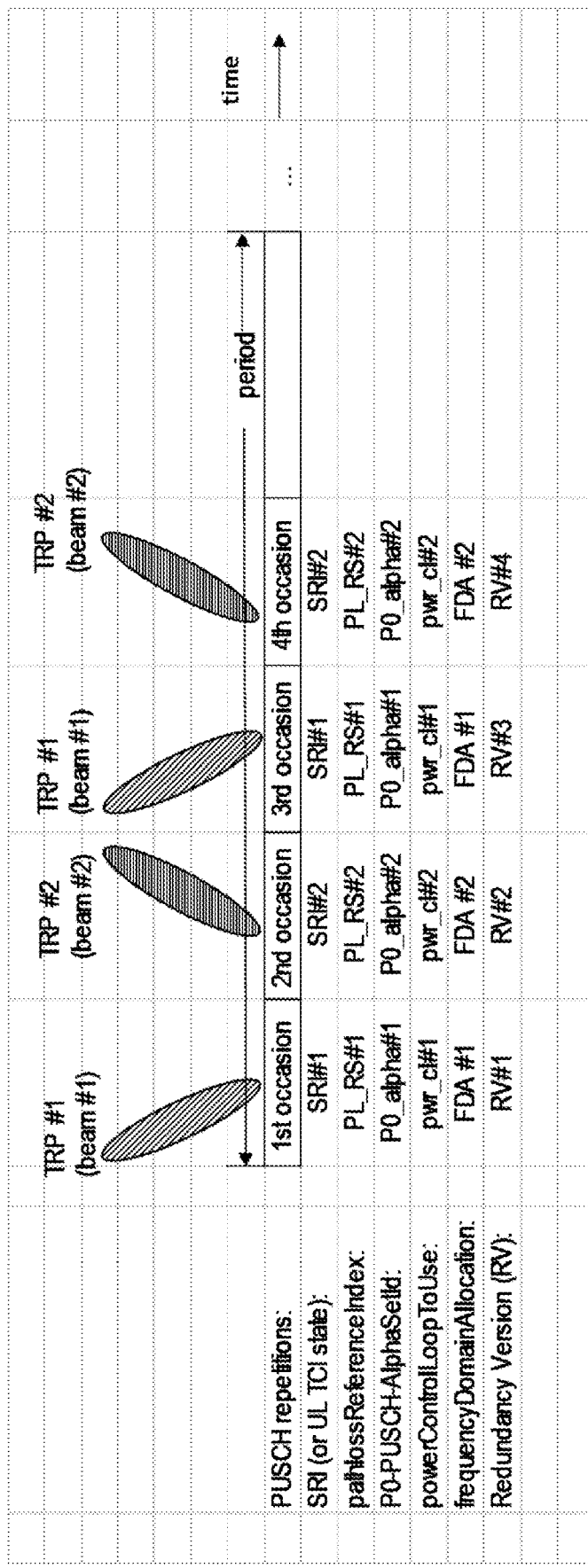
FIG. 5 illustrates an example of transmitting PUSCH of configured grant to multiple TRPs, in which a configured grant is configured with four PUSCH repetitions towards two TRPs within each of 4 transmission periods.

Generally, embodiments of the present disclosure is directed to transmitting PUSCH of configured grant to multiple TRPs. In these embodiments, PUSCH repetitions based on a configured grant are transmitted towards different TRPs (e.g., different RAN nodes (e.g., different base stations/nodes 402/406)). An example is shown in FIG. 5, where a configured grant is configured with four PUSCH repetitions (e.g., two or more) towards two TRPs within each transmission period of the 4 transmission periods (e.g., two or more). The two TRPs are indicated by either two different SRS resource indicators (i.e., SRS Resource Indicator (SRI) #1 and SRI #2) or two UL TCI states. For each TRP, it is associated with a set of parameters including one or more of a pathloss Reference Signal (RS), a power control loop to use, a set of open-loop power control parameters, and a frequency domain resource allocation. The multiple TRPs or beams are indicated by multiple SRIs or UL TCI states, each associated with a TRP or beam.

The CG can be either a type 1 CG or a type 2 CG configured with either type A or type B repetition. In case of type 1 CG, the SRIs (or UL TCI states) and the associated parameters are configured semi-statically by higher layer (e.g., RRC). In case of type 2 CG, the SRIs (or UL TCI states) and the associated parameters may be either configured by higher layers or signaled in DCI activating the CG. In other words, the activating DCI may signal which of multiple parameters to apply (e.g., a first p0-PUSCH-Alpha parameter, a second powerControlLoopToUse parameter, etc.).

In case of type A repetition, the transmission occasions are in consecutive slots (e.g., starting at a first symbol in a slot and having a duration of 4 to 14 consecutive symbols, etc.). In case of type B repetition, the transmission occasions are mini-slots and may be within a slot or across two consecutive slots (e.g., starting at any symbol in a slot and having a duration of 4 to 14 consecutive symbols, etc.).

I.a Mapping TRP to Transmission Occasions

In the example shown in FIG. 5, TRPs are allocated (e.g., mapped) in a cyclic manner starting from the first TRP associated with the $1^{st}$ SRI (or UL TCI state) at the $1^{st}$ PUSCH transmission occasion within a period, the $2^{nd}$ TRP at the $2^{nd}$ transmission occasion (e.g., PUSCH occasion), and then the $1^{st}$ TRP at the $3^{rd}$ occasion and the $2^{nd}$ TRP at the $4^{th}$ occasion, and so forth. In other words, the odd numbered occasions are mapped to the first TRP and even numbered occasions are mapped to the second TRP. This is good if the UE has two active panels and the switching time between panels is small and negligible.

Alternatively, if panel switching time is not negligible and a time gap may be needed for a switching, TRPs/beams may be allocated sequentially, i.e., the PUSCH is sent to the $1^{st}$ TRP in a first number of transmission occasions and to the $2^{nd}$ TRP in the remaining transmission occasions (e.g., For K transmission occasions, the $1^{st}$ [K/2] occasions may be associated with the $1^{st}$ TRP and the remaining occasions may be associated with the $2^{nd}$ TRP.

In case of PUSCH repetition type A, K is configured number of repetitions. For PUSCH type B repetition, K is the nominal number of transmission occasions.

Figures 6A, 6B:
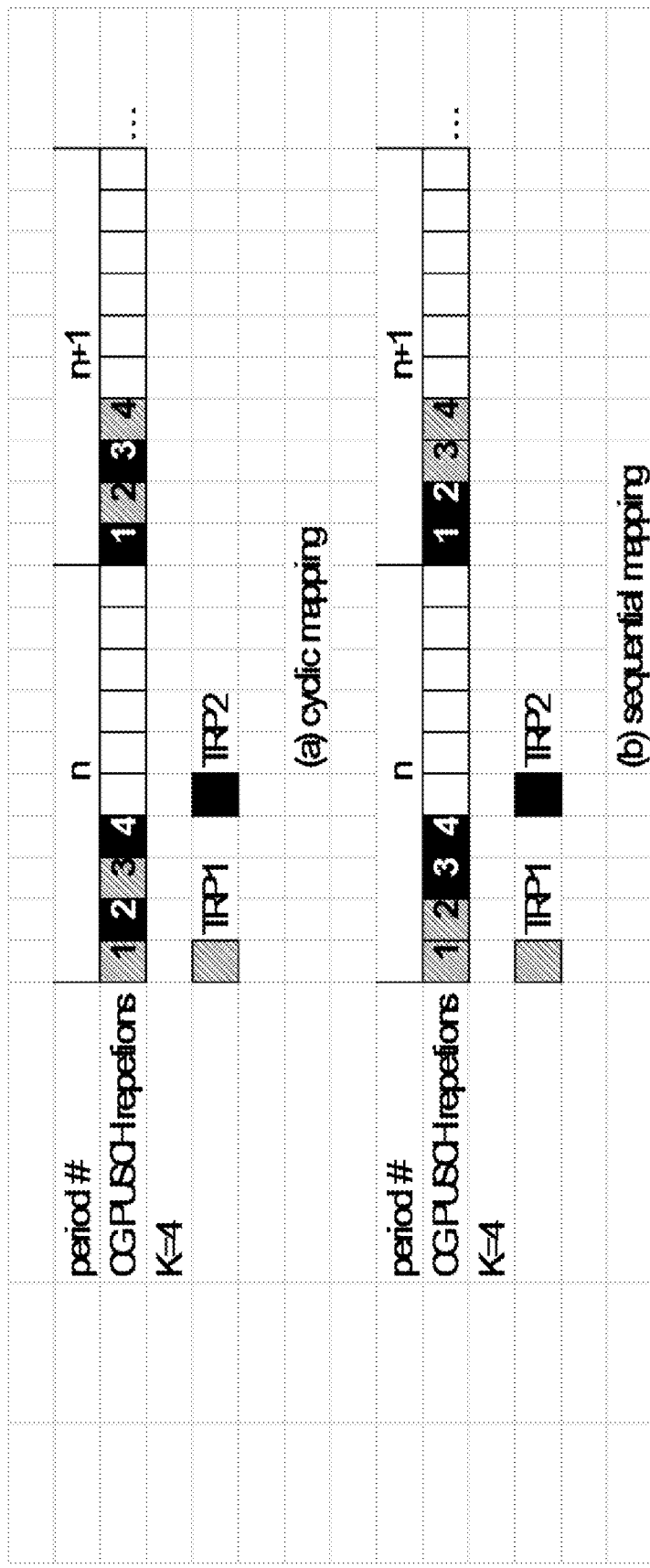
FIG. 6A illustrates an example of cyclic mapping in which TRP1 is mapped the $1^{st}$ and the $3^{rd}$ PUSCH occasions in period #n and to the $2^{nd}$ and the $4^{th}$ PUSCH occasions in period #n+1.
FIG. 6B illustrates the example of FIG. 6A in which the two TRPs have switched positions in the two CG periods.

Due to invalid symbols and collisions with other channels or signals, some of the nominal repetition occasions may be omitted or shortened. To make PUSCH transmission more evenly distributed among multiple TRPs, the mapping to TRPs may be changed in different time periods. For example, the TRP associated with the $1^{st}$ SRI is mapped to the first PUSCH repetition occasion in one period and the TRP associated to the $2^{nd}$ SRI is mapped to the first PUSCH repetition occasion in the next period. An example is shown in FIG. 6. Cyclic mapping is shown in FIG. 6($a$), where TRP1 is mapped the $1^{st}$ and the $3^{rd}$ PUSCH occasions in period #n and to the $2^{nd}$ and the $4^{th}$ PUSCH occasions in period #n+1 (e.g., odd numbered occasions are mapped to the first TRP and even numbered occasions are mapped to the second TRP, etc.). Similarly, for sequential mapping in FIG. 6($b$), the two TRPs have switched positions in the two CG periods. In case of type B repetition, the repetition occasions are the nominal repetition occasions. In other words, TRPs can be mapped to CG PUSCH repetition occasions in a cyclic or sequential manner based at least in part on nominal PUSCH repetition occasions.

I.B Mapping RV to Transmission Occasions

For existing single TRP based type 1 and type 2 CG, the higher layer configured parameters repK-RV defines the redundancy version pattern or sequence to be applied to the repetitions. For the nth transmission occasion among all the actual repetitions (including the actual repetitions that are omitted) of the K nominal repetitions, it is associated with $(\mathrm{mod}(n-1,4)+1)^{th}$ value in the configured RV sequence.

When multiple TRPs are configured for a CG (i.e., configured with multiple SRIs or UL TCI states), RV sequence may be applied independently for each TRP. This ensures that if one TRP is blocked, the PUSCH can be decoded from the other TRP.

For type B repetition, in one embodiment, a TRP is first associated with a subset of nominal repetitions. The actual repetitions associated with the subset of nominal repetitions for each TRP are then counted (e.g., starting from the first actual repetition, etc.). For the nth transmission occasion among all the actual repetitions (including the actual repetitions that are omitted) of a subset of nominal repetitions associated with a TRP, it is associated with the $(\mathrm{mod}(n-1,4)+1)^{th}$ value in a configured RV sequence (e.g., where n is a positive integer).

Figure 7:
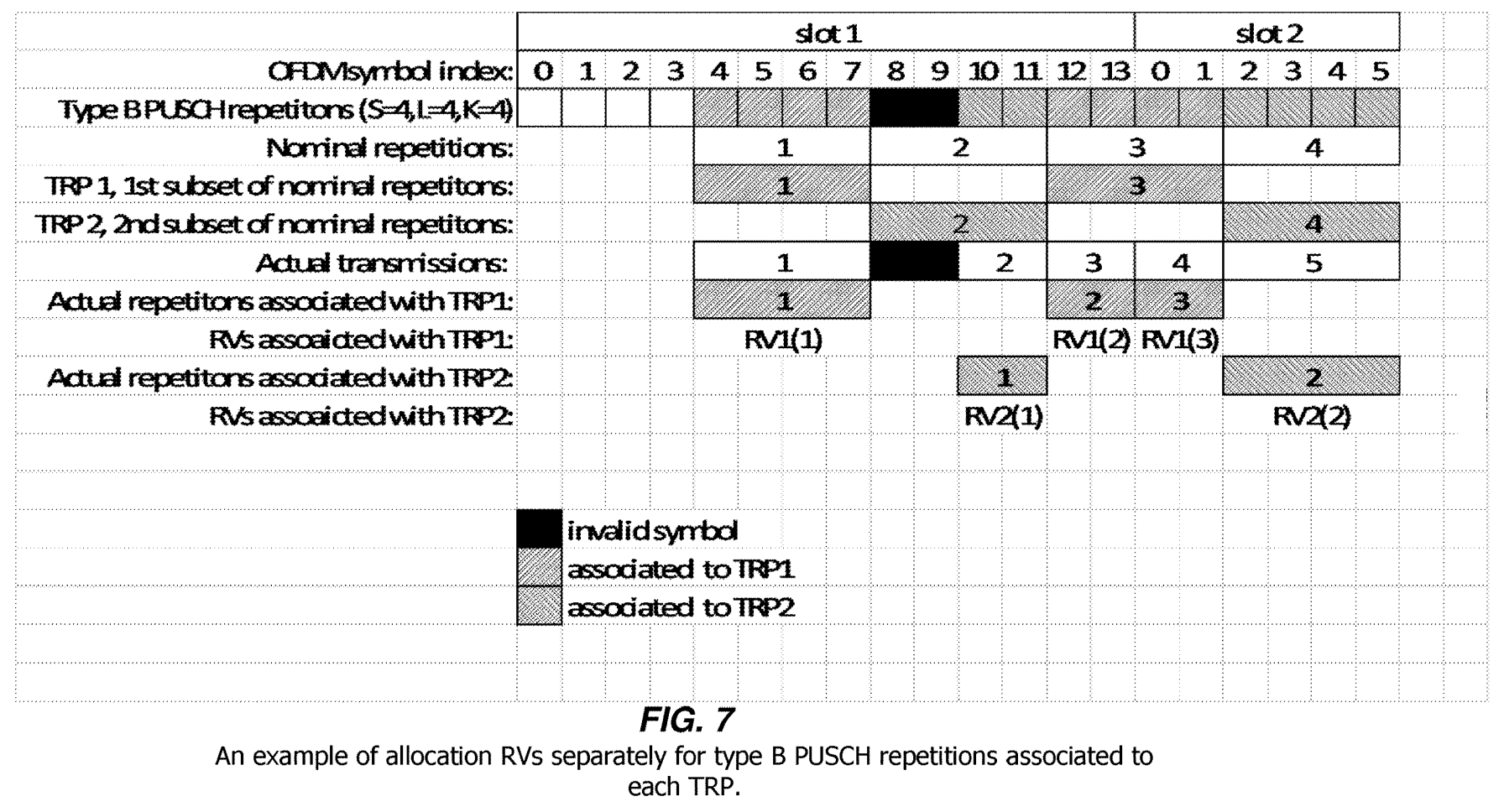

In one embodiment, separate RV sequences may be configured for each TRP. An example is shown in FIG. 7, where a type B PUSCH repetition with S=4, L=4, K=4 towards two TRPs is configured. Cyclic TRP mapping based on nominal repetitions is assumed in the example. There are 4 nominal repetitions, the $1^{st}$ and $3^{rd}$ repetitions form a first subset of nominal repetitions associated with TRP1 and the $2^{nd}$ and $4^{th}$ repetitions form a second subset of nominal repetitions for TRP2. The actual repetitions associated with the first subset of nominal repetitions are mapped to RVs based on a first RV sequence (i.e., RV1(n)) configured for TRP1 and the actual repetitions associated with the $2^{nd}$ subset of nominal repetitions are mapped to RVs based on a second RV sequence (i.e., RV2(n)) configured for TRP2. Note that for TRP1, the number of actual repetitions is different from the nominal repetitions.

Figure 8:
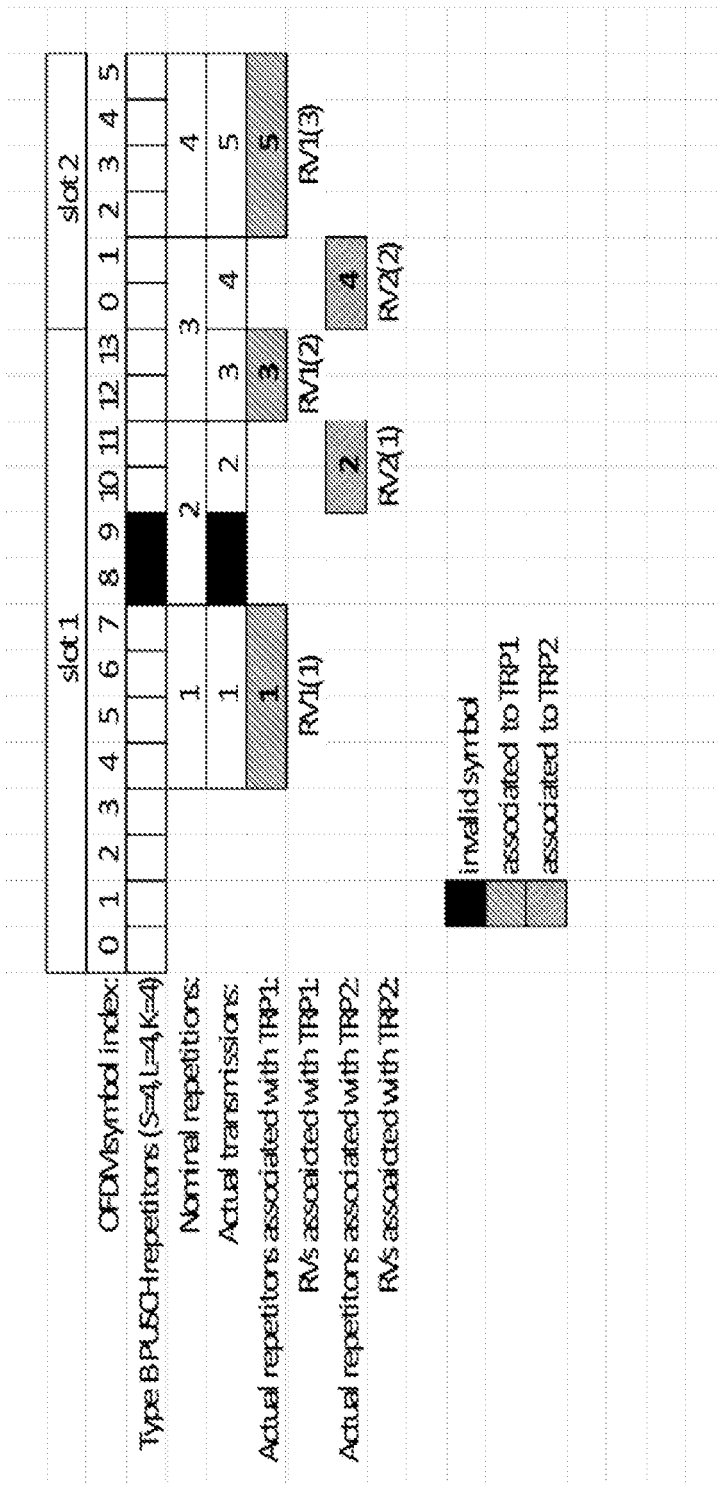
FIG. 8 illustrates an example for configuration of separate repK-RV for each TRP for a type B repetition with S=4, L=4, K=4.

For type B repetition, in a second embodiment, a TRP is associated with a subset of actual repetitions. For the nth transmission occasion among all the actual repetitions, it is associated with $(\mathrm{mod}(n-1,4)+1)^{th}$ value in the configured RV sequence. In one embodiment, separate repK-RV may be configured for each TRP. A second example is shown in FIG. 8, where a type B repetition with S=4, L=4, K=4. Cyclic TRP mapping based on actual repetitions is assumed in the example. The 4 nominal repetitions are split into 5 actual repetitions. Actual repetitions 1, 3, and 5 form a first subset of actual repetitions associated with TRP1, and actual repetitions 2 and 4 form a second subset of actual repetitions associated with TRP2. The first subset of actual repetitions are mapped to RVs based on a first RV sequence (i.e., RV1(n)) configured for TRP1, and the second subset of actual repetitions are mapped to RVs based on a second RV sequence (i.e., RV2(n)) configured for TRP2.

In another embodiment, a single RV sequence, repK-RV, may be configured for both TRPs (e.g., RV={RV1, RV2 ... RVN, etc.). In this case, an RV offset, RV offset, may be configured for a CG so that the RV offset is applied to the second TRP (e.g., RV_offset=1, 2, 3, etc.). For the nth transmission occasion among all the actual repetitions (including the actual repetitions that are omitted) of the subset of nominal repetitions associated with the $2^{nd}$ TRP, it is associated with $(\text{mod}(n-1+\text{RV\_offset},4)+1)^{th}$ value in the configured RV sequence by repK-RV.

For a CG configured with multiple TRPs, the initial transmission of a transport block may start at any of the transmission occasions of the K repetitions that are associated with RV=0.

I.C Per TRP Frequency Hopping

When inter-slot Frequency Hopping (FH) is configured for a CG with type A repetition and with multiple TRPs (i.e., multiple SRIs or UL TCI states) configured, in one embodiment, FH is applied in the same way as in a single TRP case, i.e., the starting RB during slot $n_s^\mu$ is given by:

$$RB_{start}(n_s^\mu) = \begin{cases} RB_{start} & \lfloor n_s^\mu /2 \rfloor \bmod 2 = 0 \\ (RB_{start} + RB_{offset}) \bmod N_{BWP}^{size} & \lfloor n_s^\mu /2 \rfloor \bmod 2 = 1 \end{cases}$$

where $n_s^\mu$ is the current slot number within a radio frame, where a multi-slot PUSCH transmission can take place, $RB_{start}$ is the starting RB within a UL BWP of $N_{BWP}^{size}$ RBs, as calculated from the frequency domain resource allocation information of resource allocation type 1 (i.e., a set of contiguously allocated non-interleaved virtual resource blocks within the active bandwidth part) and $RB_{offset}$ is the frequency offset in RBs between the two frequency. An example is shown in FIG. 9, where f1 and f2 are the starting RBs. The drawback of this approach is that for each TRP, a same starting RB is allocated and frequency diversity is not achieved when one TRP is blocked.

In another embodiment, the FH is applied in a per TRP basis. In case of cyclic based TRP mapping, the starting RB during slot $n_s^\mu$ is given by:

$$RB_{start}(n_s^\mu) = \begin{cases} RB_{start} & \lfloor n_s^\mu /2 \rfloor \bmod 2 = 0 \\ (RB_{start} + RB_{offset}) \bmod N_{BWP}^{size} & \lfloor n_s^\mu /2 \rfloor \bmod 2 = 1 \end{cases}$$

An example is shown in FIG. 10, where the starting RBs (denoted as f1 and f2) changes in a per TRP basis. The benefit with the per TRP based FH is that frequency diversity is achieved toward each TRP.

Figure 11:
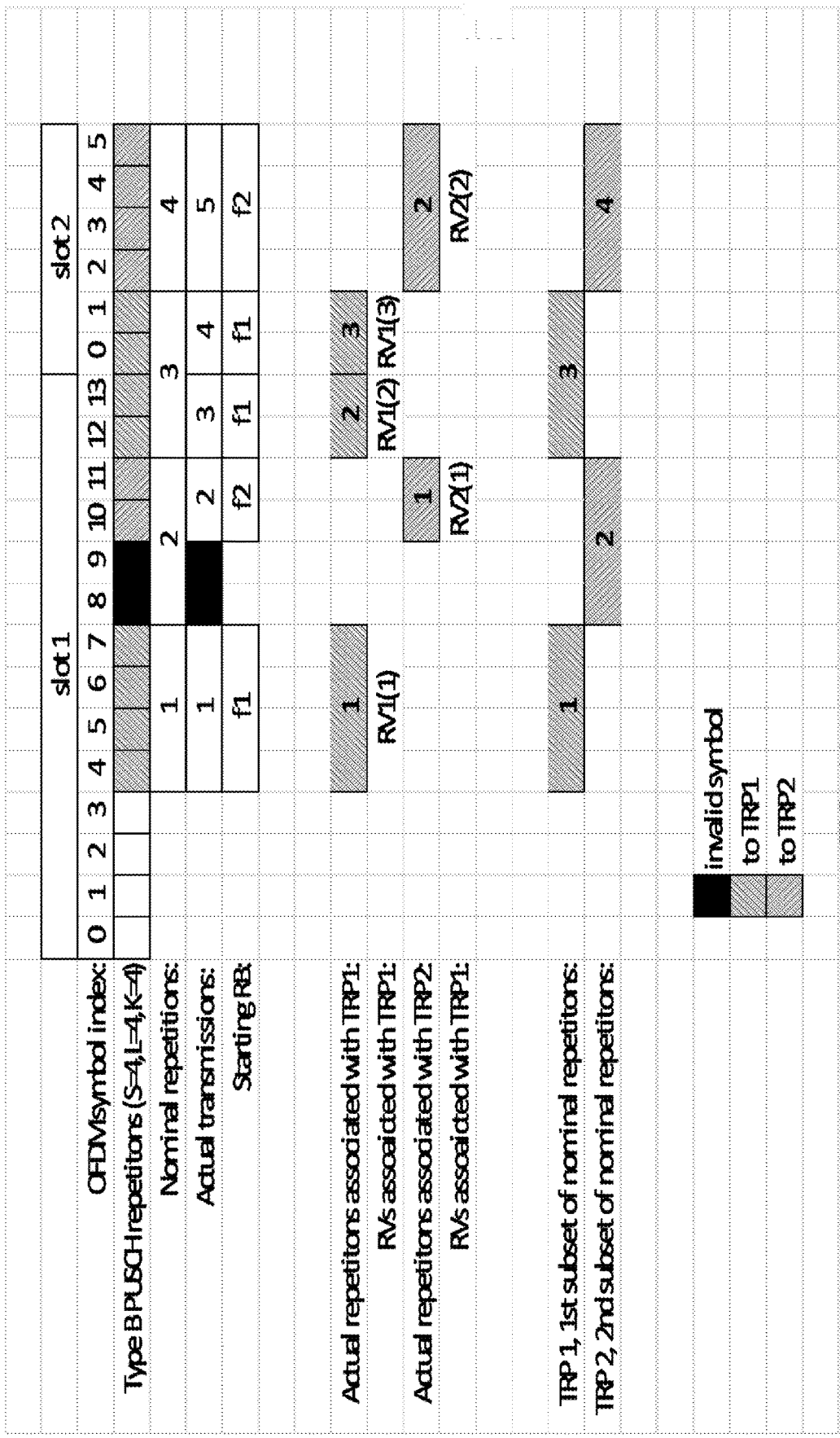
FIG. 11 illustrates an example of frequency hopping in which frequency hopping is applied in the same way as in a single TRP case.

When inter-repetition FH is configured for a CG with Type B PUSCH repetition and with multiple TRPs (i.e., multiple SRIs or UL TCI states), in one embodiment, FH is applied in the same way as in a single TRP case, i.e., the starting RB for an actual repetition within the n-th nominal repetition is given by:

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases}$$

where $RB_{start}$ is the starting RB within the UL BWP, as calculated from the resource block assignment information of resource allocation type 1 and $RB_{offset}$ is the frequency offset in RBs between the two frequency hops. An example is shown in FIG. 11. It can be seen that the same starting RB is used for transmission occasions to a same TRP. The drawback of this approach is that for each TRP, frequency diversity is not achieved when one TRP is blocked.

In another embodiment, the FH is applied in a per TRP basis. In case of cyclic based TRP mapping, the nominal repetitions are divided into two subsets that are each associated with one TRP. FH is applied to each subset of nominal repetitions separately. The starting RB for an actual repetition within the m-th nominal repetition within each subset is given by:

$$RB_{start}(m) = \begin{cases} RB_{start} & (m) \bmod 2 = 0 \\ (RB_{start} + RB_{offset}) \bmod N_{BWP}^{size} & (m) \bmod 2 = 1 \end{cases}$$

Figure 12:
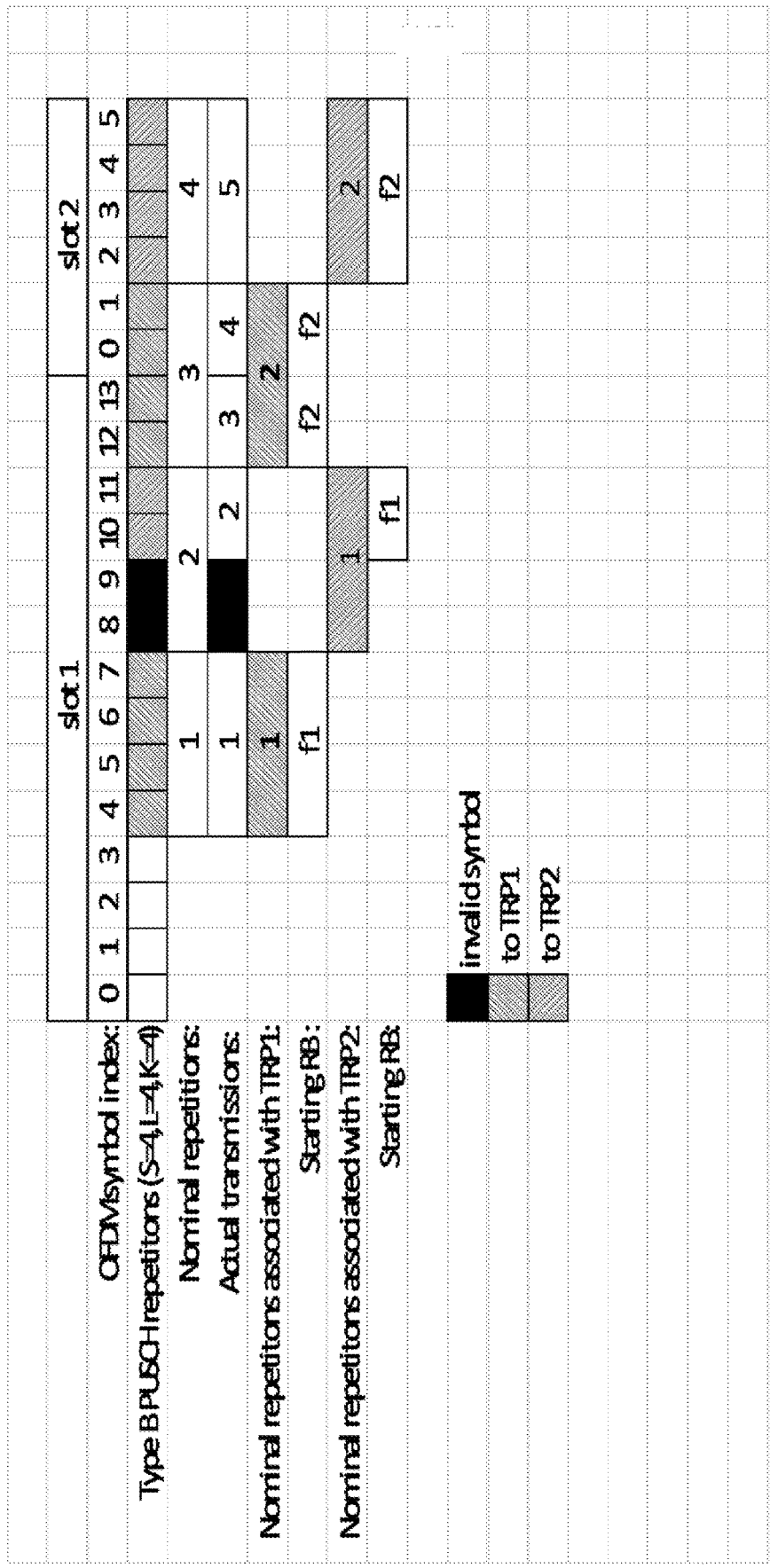
FIG. 12 illustrates an example of frequency hopping in which the same CG as that illustrated in FIG. 11 is used, but Frequency Hopping (FH) is performed in a per TRP basis.

An example is shown in FIG. 12, where the same CG as that in FIG. 11 is used, but FH is performed in a per TRP basis. The benefit with this per TRP based FH is that frequency diversity is achieved toward each TRP.

In yet another embodiment, the FH is applied in a per TRP basis. In case of cyclic based TRP mapping, the actual repetitions are divided into two subsets each associated with one TRP. FH is applied to each subsets of actual repetitions separately. The starting RB for the $(m')^{th}$ actual repetition within each subset is given by:

$$RB_{start}(m') = \begin{cases} RB_{start} & (m') \bmod 2 = 0 \\ (RB_{start} + RB_{offset}) \bmod N_{BWP}^{size} & (m') \bmod 2 = 1 \end{cases}$$

A second example is shown in FIG. 13, where the same CG as that in FIG. 11 is used, but FH is performed in a per TRP basis and FH is applied to each subset of actual repetitions separately.

In some embodiments, when the UE receives two frequency domain resource allocations (i.e., two frequencyDomainAlllocation's) of type 1 corresponding to the two TRPs for configured grant based PUSCH, the UE also receives two frequency offset values (e.g., frequencyHoppingOffset and frequencyHoppingOffset2) corresponding to the two TRPs. Then, in one example embodiment, the starting RB for the $(m_p)$-th repetition corresponding to the p-th TRP is given by:

$$RB_{start}(m_p) = \begin{cases} RB_{start,p} & (m_p) \bmod 2 = 0 \\ (RB_{start,p} + RB_{offset,p}) \bmod N_{BWP}^{size} & (m_p) \bmod 2 = 1 \end{cases}$$

In the above formula, $RB_{start,p}$ and $RB_{offset,p}$ respectively represent the starting RB and the frequency hopping offset corresponding to the p-th TRP. In some embodiments, $m_p$ represents the repetition index counted locally within the p-th TRP. FIG. 14 shows an example of how repetition indices m1 and m2 are related to different PUSCH repetitions. In some embodiments, the above method for determining the starting RB per TRP can be applied to both PUSCH repetition types A and B.

I.D Per TRP MCS, Frequency Domain Resource Allocation (FDRA), and Precoder Matrices When transmitting PUSCH to multiple TRPs, the channel condition and interference experienced at each TRP may be different. In one embodiment, a separate MCS may be configured for each TRP in a type 1 CG configured with multiple TRPs. For a given Transport Block (TB) size, different number of RBs may need to be allocated for different TRPs. Thus, in another embodiment, a separate Frequency Domain Resource Allocation (FDRA) may be configured for the CG. In yet another embodiment, different precoding matrices may be suitable for different TRPs, and different precoding matrices (via different precodingAndNumberOfLayers parameters) may be configured for each TRP. It is also possible that different number of layers are configured for each TRP in some embodiments.

The higher layer configurations in Information Element (IE) configuredGrantConfig, cg-DMRS-Configuration, mcs-Table, mcs-TableTransformPrecoder, uci-OnPUSCH, resourceAllocation, rbg-Size, powerControlLoopToUse, p0-PUSCH-Alpha, transformPrecoder, repK-RV, can be differently configured of different TRPs (e.g., two parameters configured for two respective TRPs, etc.). For type 1 configured grant, additionally the parameters in rrc-ConfiguredUplinkGrant, timeDomainOffset, timeDomainAllocation, frequencyDomainAllocation, antennaPort, dmrs-SeqInitialization, precodingAndNumberOfLayers, srs-ResourceIndicator, mcsAndTBS, frequencyHoppingOffset, pathlossReferenceIndex, can be differently configured for different TRPs. As an example, for two TRPs, configured grant may include two of various RRC parameters (e.g., pathlossReferenceIndex, srs_resourceIndicator, precodingAndNumberOfLayers, etc.) which can be associated separately to the two TRPs (e.g., a first powerControlLooptoUse and a first p0-PUSCH-Alpha parameter with a first SRS Resource set, a second powerControlLooptoUse and a second p0-PUSCH-Alpha parameter with a second SRS Resource set, etc.).

I.E Multiplexing with UCI

In one embodiment, if a UCI is multiplexed with first transmitted TRP, same UCI is multiplexed on the second TRP. The first TRP and second TRP is decided by the mapping order of spatial relationship or UL TCI in the activating DCI.

II. Overlapping Between Two Uplink Grants

II.A Overlapping Between DG PUSCH and CG-PUSCH

For the collision between Dynamic Grant (DG) PUSCH scheduled by DCI and CG PUSCH with same or different PHY priorities, DG PUSCH can be scheduled to overlap in time with CG-PUSCH if the DCI scheduling the DG-PUSCH is sufficiently early such that cancellation timeline is satisfied.

Figure 15:
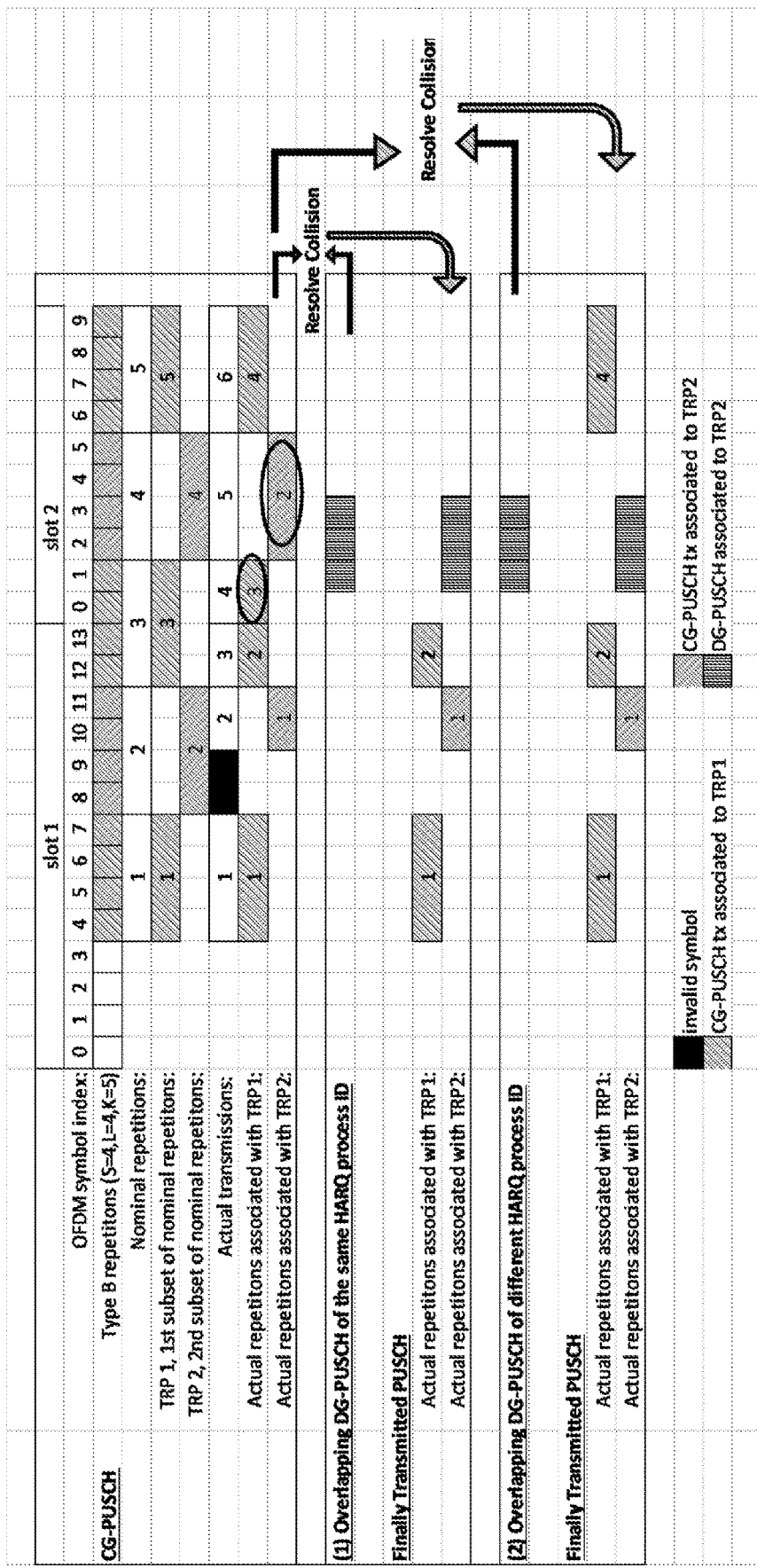
FIG. 15 illustrates an example in which Dynamic Grant (DG)-PUSCH overrides CG-PUSCH till the end of all CG-PUSCH occasions, starting with the first actual repetition of CG-PUSCH that overlaps with DG-PUSCH.

For CG PUSCH with repetition, MAC treats each CG PUSCH transmission occasion as a separate grant. The overlapping is handled for each transmission occasion individually. MAC treats each repetition as a separate uplink grant. For a DG PUSCH scheduled by a DCI overlapping a CG PUSCH configured with nominal repetition factor K>1:
If the HARQ process is the same between the DG-PUSCH and the CG-PUSCH:
In one method, DG-PUSCH may override all remaining repetition occasions after the end of PDCCH reception, as long as the timeline requirement is satisfied (see Third Generation Partnership Project (3GPP) TS 38.214, Section 6.1).
In another method, DG-PUSCH overrides CG-PUSCH till the end of all CG-PUSCH occasions, starting with the first actual repetition of CG-PUSCH that overlaps with DG-PUSCH; This is illustrated by DG-PUSCH (1) overlapping with CG-PUSCH in FIG. 15.
If the HARQ process is not the same between the DG (e.g., the dynamically scheduled repetitions) and the CG (e.g., the PUSCH repetitions, etc.):
In one method, DG-PUSCH may override only the overlapping repetition occasions of the CG-PUSCH after the end of PDCCH reception, as long as the timeline requirement is satisfied (see 3GPP TS 38.214, Section 6.1).
In another method, DG may override only the actual repetition(s) of the CG overlapped with DG, as long as the timeline requirement is satisfied (see 3gpp TS 38.214 section 6.1). This is illustrated by DG-PUSCH (2) overlapping with CG-PUSCH in FIG. 15.

In the illustrated examples, it is assumed that the UE can transmit over one TRP at a time (i.e., cannot transmit to two TRP simultaneously). Hence, prioritized transmission of one channel (e.g., DG-PUSCH) on one TRP will cause cancellation of overlapping, deprioritized, channel (e.g., CG-PUSCH) on the other TRP.

While the illustration assumes that the DG-PUSCH is scheduled over one of the multiple TRP, the same principle applies to many other variations. For example, the same principle can be applied to any of the following variations
CG-PUSCH and its repetitions (if any) are configured over one of the multiple TRP only, while the DG-PUSCH and its repetitions (if any) is scheduled over multiple TRPs.
CG-PUSCH and its repetitions (if any) are configured over multiple TRPs, while the DG-PUSCH and its repetitions (if any) is scheduled over one of the multiple TRPs only.
Both CG-PUSCH and DG-PUSCH, and their repetitions (if any), are configured over multiple TRPs.
While the illustrated examples assume that the UE can transmit over one TRP at a time (i.e., cannot transmit to two TRP simultaneously), it is possible that in some embodiments the UE can transmit to two (or more) TRP simultaneously. In this case, the DG-PUSCH can be scheduled to overlap with CG-PUSCH over the multiple TRPs, and the collision resolution is then handled for each TRP individually.

II.B Overlapping Between DG-PUSCH and CG-PUSCH of Different Priority

Multiple CG PUSCH of different priority can be configured to overlap in time. It is allowed that MAC has sent one TB to the earlier CG of lower priority, and then send a second TB to the later CG of higher priority. For this case, UE implementation ensures that the lower priority CG is cancelled before the start of higher priority CG.

For CG PUSCH with repetition, the MAC treats each CG PUSCH transmission occasion as a separate grant. The overlapping and prioritization are handled for each transmission occasion individually.
In one method, the higher-priority CG occasion is prioritized over the entire overlapping low-priority CG occasion, and the cancellation of low-priority CG is applied till the end of its repetitions (if any).
In another method, the high-priority CG occasion overrides the overlapping actual repetition(s) of the overlapping low-priority CG occasion. That is, earlier actual repetition(s) of the low-priority CG occasion that does not overlap with the high-priority CG occasion are not cancelled. The cancellation of low-priority CG is applied till the end of its repetitions (if any). This method is illustrated in FIG. 16.

Figure 16:
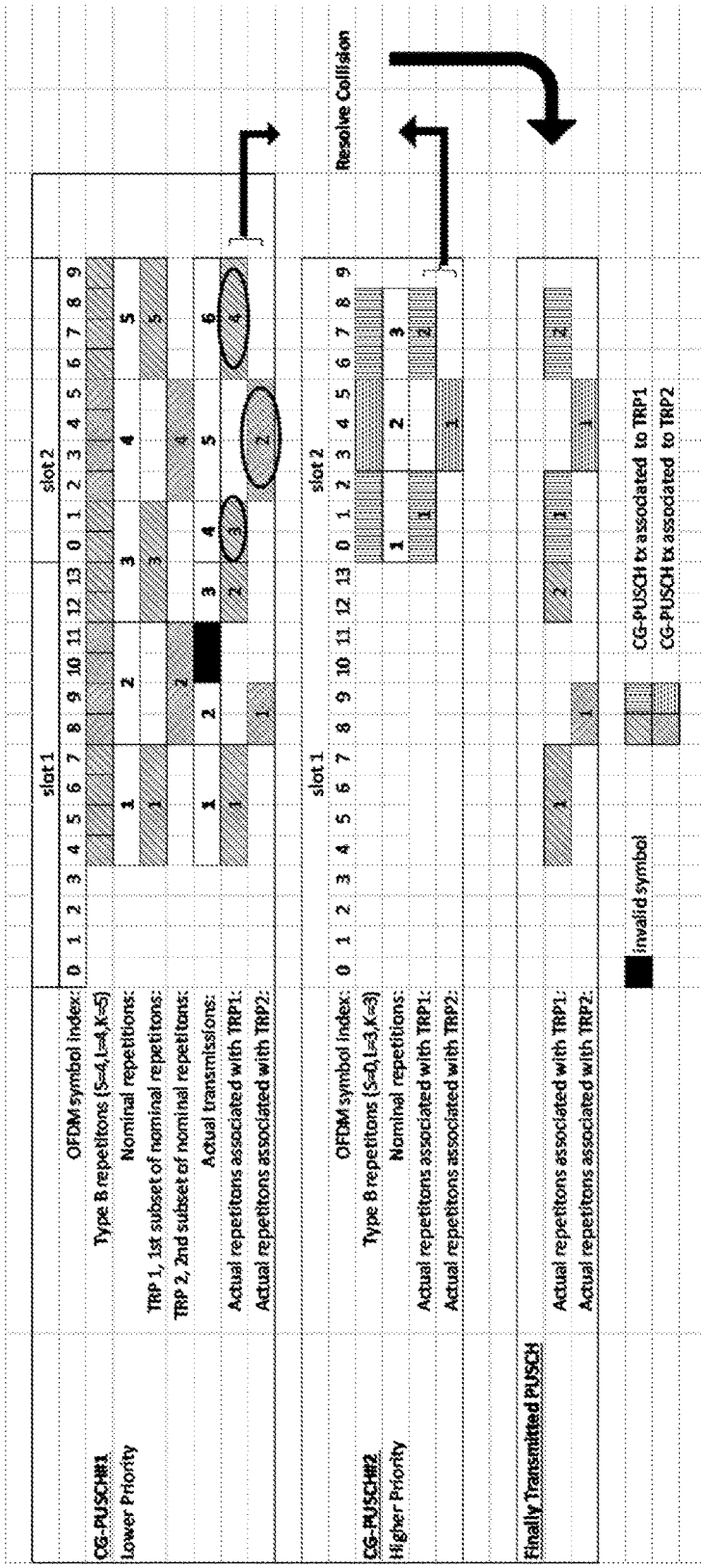
FIG. 16 illustrates an example of a method in which the high-priority CG occasion overrides the overlapping actual repetition(s) of the overlapping low-priority CG occasion.

While the example illustration of FIG. 16 assumes that the both CG-PUSCHs are scheduled over multiple TRP, the same principle applies to other variations. For example, the same principle can be applied to the case where one CG-PUSCH and its repetitions (if any) are configured over one of the multiple TRP only, while the other CG-PUSCH and its repetitions (if any) is scheduled over multiple TRPs.

While the example illustration of FIG. 16 assumes that the UE can transmit over one TRP at a time (i.e., cannot transmit to two TRP simultaneously), it is possible that in some embodiments the UE can transmit to two (or more) TRP simultaneously. In this case, two DG-PUSCHs can be scheduled to overlap over the multiple TRPs, and the collision resolution is then handled for each TRP individually.

III. Updating of Beams for CG

For type 2 CG, it is activated or deactivated by a DCI with DCI format 0-1 or 0-2. The transmit beam(s) to be used for the CG transmission is indicated to the UE via the "SRS resource indicator" field in the activating DCI with its Cyclic Redundancy Check (CRC) scrambled by Configured Scheduling (CS) Radio Network Temporary Identifier (CS-RNTI). When gNB observed that a new beam is more proper for the PUSCH transmission, another activation DCI can be sent to UE in order to update the beam and potentially the resource allocations. A timer is defined for a UE to switch to the new beam. If a UE is capable of supporting multiple configured grant services as defined in Rel-16, the same configuredGrantConfigIndex-r16 is indicated in harqProcessID field in the activation DCI.

For M-TRP, the time needed for UE to perform beam switching can be different from the single TRP operation as the switching may require UL panel switching, which may take a longer time.

Thus, for CG with multiple TRPs (i.e., with multiple SRIs, Transmit Precoding Matrix Indicators (TPMIs), UL TCI states, etc.), a specific DCI or specific DCI field in the activating DCI may be used for updating existing activated beams. When such DCI indication is received by a UE, a new timer may be defined such that the UE applies the new beam(s) only after the timer expires. The timer may start after an ACK is sent or after the last symbol of the DCI. The timer value may depend on the number of panels the UE can support for UL and can be signaled to gNB through capability signaling.

Additional Description

Figure 17:
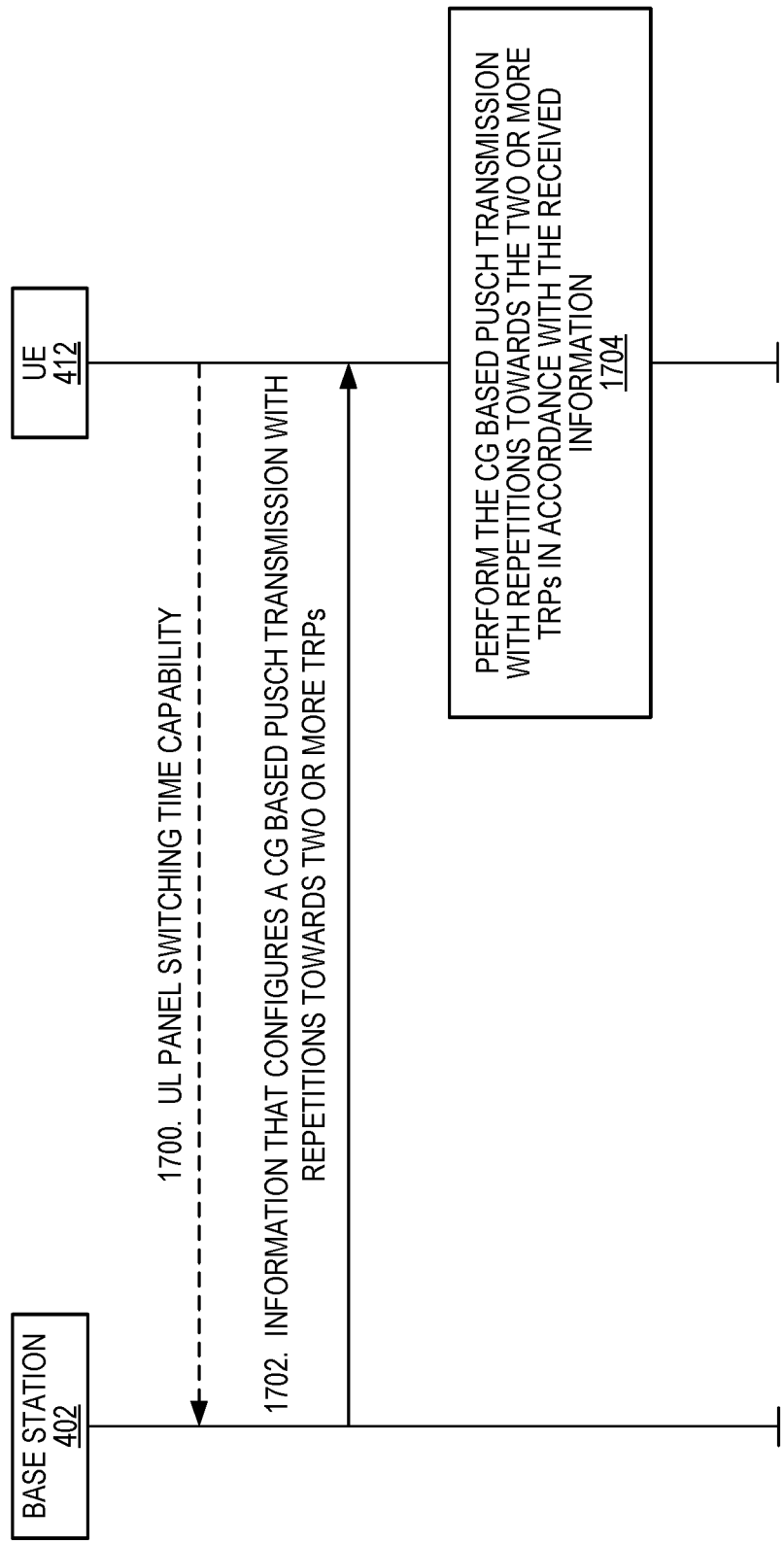
FIG. 17 is a flow chart that illustrates the operation of a wireless communication device (e.g., a User Equipment (UE)) and a base station in accordance with at least some of the embodiments described above.

FIG. 17 is a flow chart that illustrates the operation of a wireless communication device 412 (e.g., a UE) and a base station 402 in accordance with at least some of the embodiments described above. Optional steps are represented by dashed lines/boxes. As illustrated, the wireless communication device 412 optionally sends, to the base station 402, information that indicates a capability of the wireless communication device 412 for UL panel switching time for CG beam updates (step 1700). Note that an "UL panel" is an antenna array at the wireless communication device 412 used to form an UL/transmit beam. Thus, for example, if the wireless communication device 412 has two such UL panels, the wireless communication device 412 can simultaneously transmit on two UL beams or transmit on one beam with one panel at a time. The UL panel switching time is the time needed by the wireless communication device 412 to change the UL/transmit beam direction of an UL panel.

The base station 402 transmits, and the wireless communication device 412 receives, information that configures the wireless communication device 412 for a CG based PUSCH transmission with PUSCH repetitions towards two or more TRPs, as described above (step 1702) (e.g., a first TRP and a second TRP). Details for numerous embodiments related to the parameters or information included in this received information are provided above and are applicable here. This information may be received via higher layer signaling (e.g., RRC signaling), dynamic signaling (e.g., DCI signaling or MAC CE), or a combination thereof. Further, details for numerous embodiments of the PUSCH transmission with repetitions towards two or more TRPs are given above and are equally applicable here. For example, details are provided previously regarding SRS resource set mapping to TRPs (e.g., the first TRP and the second TRP (e.g., of the two or more TRPs) being respectively associated with a first SRS resource set and a second SRS resource set, etc.). For another example, details are provided above in Section I and subsections I.A-I.E regarding how the two or more TRPs are indicated, e.g., in the received information, how the TRPs are mapped to PUSCH repetition occasions, how RVs are mapped to PUSCH repetition occasions, how frequency hopping can be performed for the PUSCH transmission on the different TRPs, different CG related parameters that may be configured for the CG based PUSCH transmission, and how UCI may be multiplexed with the CG based PUSCH transmission. All of these details are applicable here to the information sent/received in step 1702 and/or to the CG PUSCH transmission that is configured by the information sent/received in step 1702.

The wireless communication device 412 performs the CG PUSCH transmission with repetitions towards the two or more TRPs (e.g., the first and second TRPs at different PUSCH transmission occasions) in accordance with the received information (step 1704). Note that, during step 1704, in some embodiments, the wireless communication device 412 handles overlapping between the CG based PUSCH transmission and another PUSCH transmission, e.g., in accordance with any of the embodiments described above in Section II and subsections II.A-II.B. It should also be noted that, if the received information of step 1702 includes information that updates activated beams used for CG PUSCH transmission, the wireless communication device 412 may only update the activated beams after expiration of a predefined or configured timer, as described above in Section III.

Figure 18:
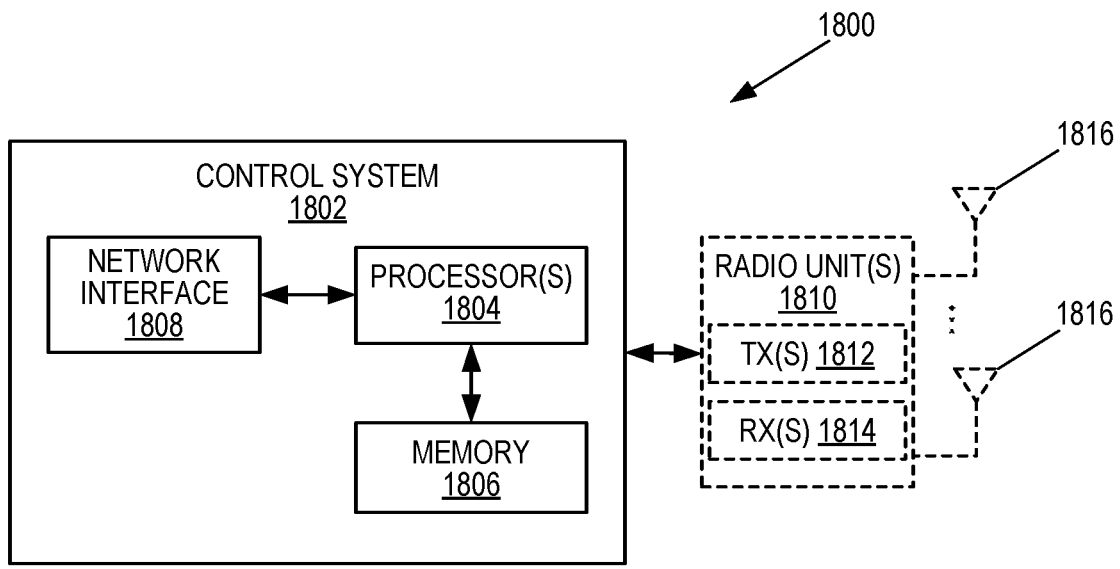
FIG. 18 is a schematic block diagram of a network node according to some embodiments of the present disclosure.

FIG. 18 is a schematic block diagram of a network node 1800 according to some embodiments of the present disclosure. Optional features are represented by dashed boxes. The network node 1800 may be, for example, a base station 402 or 406 or a network node that implements all or part of the functionality of the base station 402 or gNB or the functionality of a TRP as described herein. As illustrated, the network node 1800 includes a control system 1802 that includes one or more processors 1804 (e.g., Central Processing Units (CPUs), Application Specific Integrated Circuits (ASICs), Field Programmable Gate Arrays (FPGAs), and/or the like), memory 1806, and a network interface 1808. The one or more processors 1804 are also referred to herein as processing circuitry. In addition, if the network node 1800 is a radio access node (e.g., a base station 402), the network node 1800 may include one or more radio units 1810 that each includes one or more transmitters 1812 and one or more receivers 1814 coupled to one or more antennas 1816. The radio units 1810 may be referred to or be part of radio interface circuitry. In some embodiments, the radio unit(s) 1810 is external to the control system 1802 and connected to the control system 1802 via, e.g., a wired connection (e.g., an optical cable). However, in some other embodiments, the radio unit(s) 1810 and potentially the antenna(s) 1816 are integrated together with the control system 1802. The one or more processors 1804 operate to provide one or more functions of the network node 1800 as described herein (e.g., one or more functions of the base station 402, gNB, or TRP as described herein). In some embodiments, the function(s) are implemented in software that is stored, e.g., in the memory 1806 and executed by the one or more processors 1804.

Figure 19:
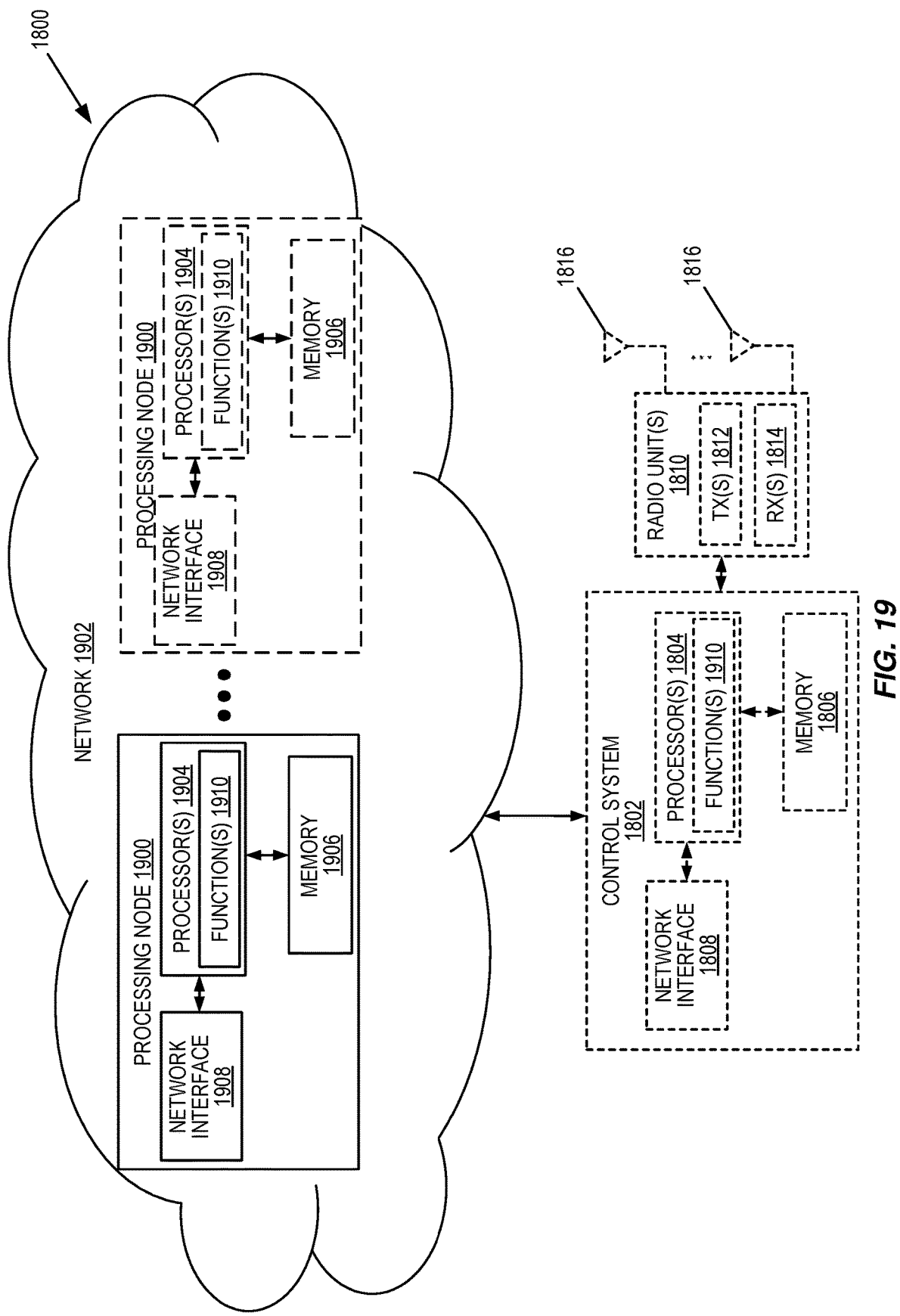
FIG. 19 is a schematic block diagram that illustrates a virtualized embodiment of the network node according to some embodiments of the present disclosure.

FIG. 19 is a schematic block diagram that illustrates a virtualized embodiment of the network node 1800 according to some embodiments of the present disclosure. Again, optional features are represented by dashed boxes. As used herein, a "virtualized" network node is an implementation of the network node 1800 in which at least a portion of the functionality of the network node 1800 is implemented as a virtual component(s) (e.g., via a virtual machine(s) executing on a physical processing node(s) in a network(s)). As illustrated, in this example, the network node 1800 includes one or more processing nodes 1900 coupled to or included as part of a network(s) 1902. Each processing node 1900 includes one or more processors 1904 (e.g., CPUs, ASICs, FPGAs, and/or the like), memory 1906, and a network interface 1908. If the network node 1800 is a radio access node (e.g., a base station 402), the network node 1800 may include the control system 1802 and/or the one or more radio units 1810, as described above. The control system 1802 may be connected to the radio unit(s) 1810 via, for example, an optical cable or the like. If present, the control system 1802 or the radio unit(s) are connected to the processing node(s) 1900 via the network 1902.

In this example, functions 1910 of the network node 1800 described herein (e.g., one or more functions of the base station 402, gNB, or TRP as described herein) are implemented at the one or more processing nodes 1900 or distributed across the one or more processing nodes 1900 and the control system 1802 and/or the radio unit(s) 1810 in any desired manner. In some particular embodiments, some or all of the functions 1910 of the network node 1800 described herein are implemented as virtual components executed by one or more virtual machines implemented in a virtual environment(s) hosted by the processing node(s) 1900. As will be appreciated by one of ordinary skill in the art, additional signaling or communication between the processing node(s) 1900 and the control system 1802 may be used in order to carry out at least some of the desired functions 1910. Notably, in some embodiments, the control system 1802 may not be included, in which case the radio unit(s) 1810 communicate directly with the processing node(s) 1900 via an appropriate network interface(s).

In some embodiments, a computer program including instructions which, when executed by at least one processor, causes the at least one processor to carry out the functionality of the network node 1800 or a node (e.g., a processing node 1900) implementing one or more of the functions 1910 of the network node 1800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
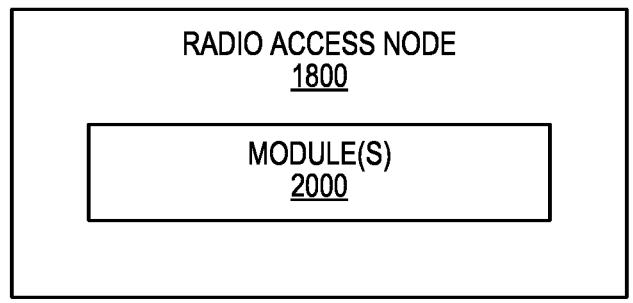
FIG. 20 is a schematic block diagram of the network node according to some other embodiments of the present disclosure.

FIG. 20 is a schematic block diagram of the network node 1800 according to some other embodiments of the present disclosure. The network node 1800 includes one or more modules 2000, each of which is implemented in software. The module(s) 2000 provide the functionality of the network node 1800 described herein (e.g., one or more functions of the base station 402, gNB, or TRP as described herein). This discussion is equally applicable to the processing node 1900 of FIG. 19 where the modules 2000 may be implemented at one of the processing nodes 1900 or distributed across multiple processing nodes 1900 and/or distributed across the processing node(s) 1900 and the control system 1802.

Figure 21:
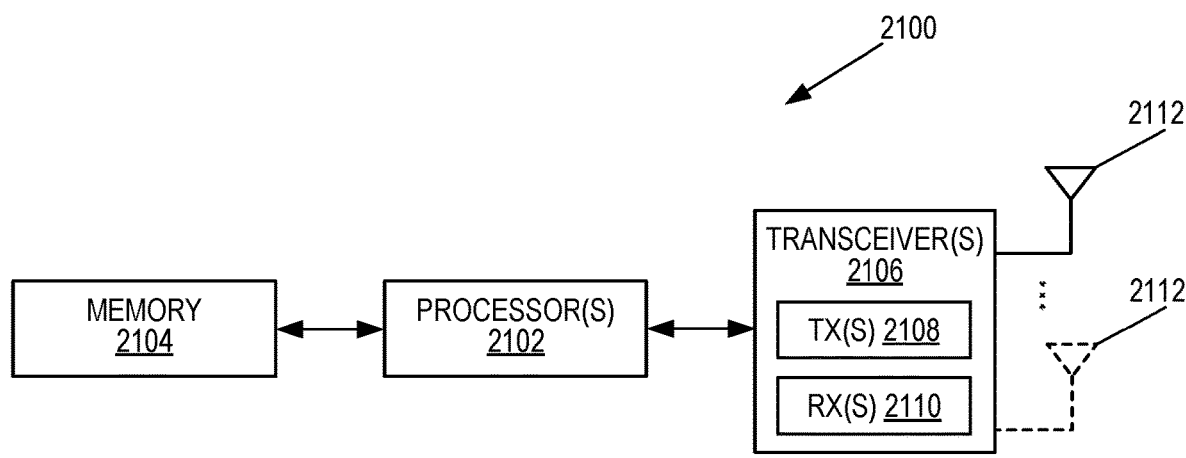
FIG. 21 is a schematic block diagram of a wireless communication device according to some embodiments of the present disclosure.

FIG. 21 is a schematic block diagram of a wireless communication device 2100 (e.g., the wireless communication device 412 or a UE) according to some embodiments of the present disclosure. As illustrated, the wireless communication device 2100 includes one or more processors 2102 (e.g., CPUs, ASICs, FPGAs, and/or the like), memory 2104, and one or more transceivers 2106 each including one or more transmitters 2108 and one or more receivers 2110 coupled to one or more antennas 2112. The transceiver(s) 2106 includes radio-front end circuitry connected to the antenna(s) 2112 that is configured to condition signals communicated between the antenna(s) 2112 and the processor(s) 2102, as will be appreciated by on of ordinary skill in the art. The processors 2102 are also referred to herein as processing circuitry. The transceivers 2106 are also referred to herein as radio circuitry. In some embodiments, the functionality of the wireless communication device 2100 described above (e.g., one or more functions of the wireless communication device 412 or UE as described herein) may be fully or partially implemented in software that is, e.g., stored in the memory 2104 and executed by the processor(s) 2102. Note that the wireless communication device 2100 may include additional components not illustrated in FIG. 21 such as, e.g., one or more user interface components (e.g., an input/output interface including a display, buttons, a touch screen, a microphone, a speaker(s), and/or the like and/or any other components for allowing input of information into the wireless communication device 2100 and/or allowing output of information from the wireless communication device 2100), a power supply (e.g., a battery and associated power circuitry), etc.

In some embodiments, a computer program including instructions which, when executed by at least one processor, causes the at least one processor to carry out the functionality of the wireless communication device 2100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
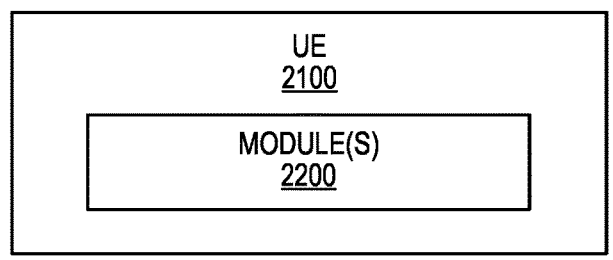
FIG. 22 is a schematic block diagram of the wireless communication device according to some other embodiments of the present disclosure.

FIG. 22 is a schematic block diagram of the wireless communication device 2100 according to some other embodiments of the present disclosure. The wireless communication device 2100 includes one or more modules 2200, each of which is implemented in software. The module(s) 2200 provide the functionality of the wireless communication device 2100 described herein (e.g., one or more functions of the wireless communication device 412 or UE as described herein).

Figure 23:
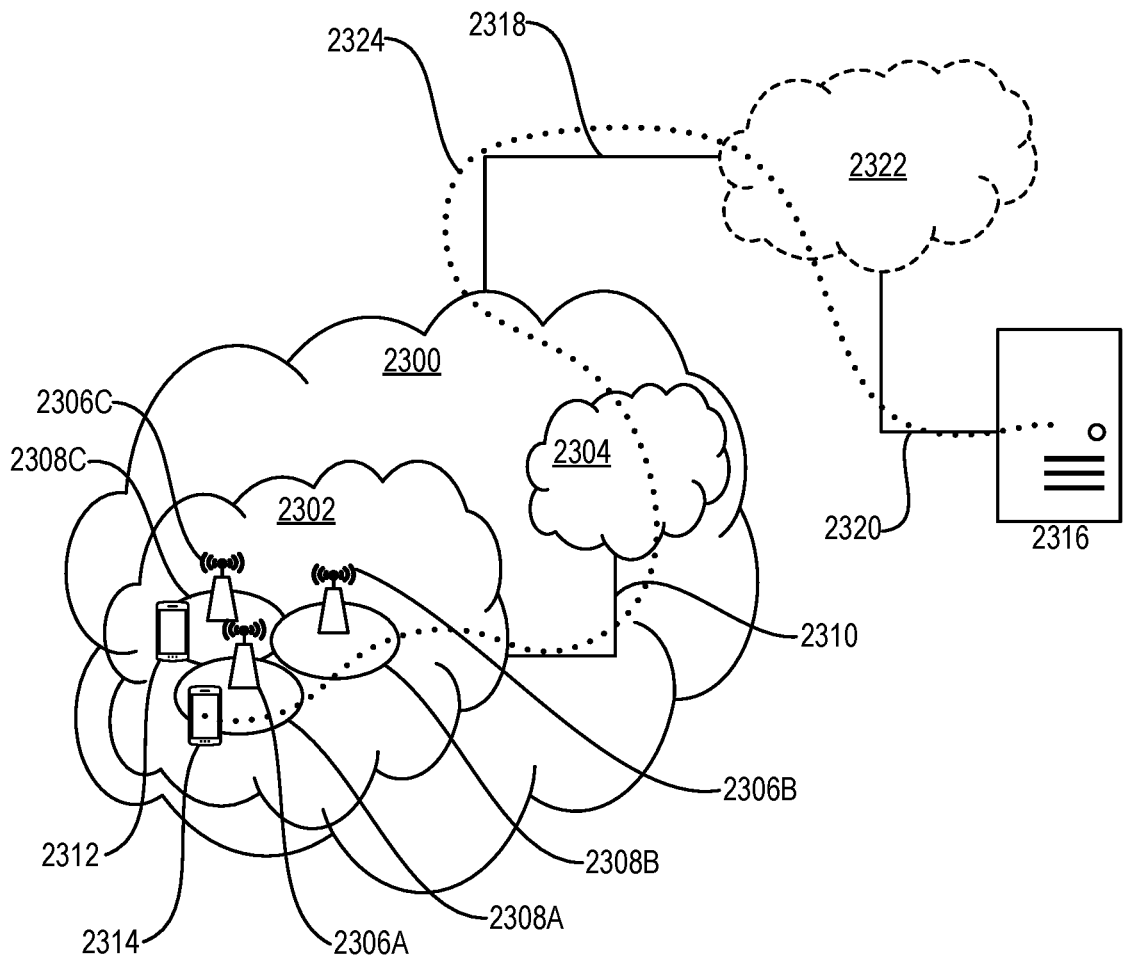
FIG. 23 illustrates an example communication system including a telecommunication network, such as a 3GPP-type cellular network, which includes an access network, such as a RAN, and a core network according to some other embodiments of the present disclosure.

With reference to FIG. 23, in accordance with an embodiment, a communication system includes a telecommunication network 2300, such as a 3GPP-type cellular network, which comprises an access network 2302, such as a RAN, and a core network 2304. The access network 2302 comprises a plurality of base stations 2306A, 2306B, 2306C, such as Node Bs, eNBs, gNBs, or other types of wireless Access Points (APs), each defining a corresponding coverage area 2308A, 2308B, 2308C. Each base station 2306A, 2306B, 2306C is connectable to the core network 2304 over a wired or wireless connection 2310. A first UE 2312 located in coverage area 2308C is configured to wirelessly connect to, or be paged by, the corresponding base station 2306C. A second UE 2314 in coverage area 2308A is wirelessly connectable to the corresponding base station 2306A. While a plurality of UEs 2312, 2314 are illustrated in this example, the disclosed embodiments are equally applicable to a situation where a sole UE is in the coverage area or where a sole UE is connecting to the corresponding base station 2306.

The telecommunication network 2300 is itself connected to a host computer 2316, which may be embodied in the hardware and/or software of a standalone server, a cloud-implemented server, a distributed server, or as processing resources in a server farm. The host computer 2316 may be under the ownership or control of a service provider, or may be operated by the service provider or on behalf of the service provider. Connections 2318 and 2320 between the telecommunication network 2300 and the host computer 2316 may extend directly from the core network 2304 to the host computer 2316 or may go via an optional intermediate network 2322. The intermediate network 2322 may be one of, or a combination of more than one of, a public, private, or hosted network; the intermediate network 2322, if any, may be a backbone network or the Internet; in particular, the intermediate network 2322 may comprise two or more sub-networks (not shown).

The communication system of FIG. 23 as a whole enables connectivity between the connected UEs 2312, 2314 and the host computer 2316. The connectivity may be described as an Over-the-Top (OTT) connection 2324. The host computer 2316 and the connected UEs 2312, 2314 are configured to communicate data and/or signaling via the OTT connection 2324, using the access network 2302, the core network 2304, any intermediate network 2322, and possible further infrastructure (not shown) as intermediaries. The OTT connection 2324 may be transparent in the sense that the participating communication devices through which the OTT connection 2324 passes are unaware of routing of uplink and downlink communications. For example, the base station 2306 may not or need not be informed about the past routing of an incoming downlink communication with data originating from the host computer 2316 to be forwarded (e.g., handed over) to a connected UE 2312. Similarly, the base station 2306 need not be aware of the future routing of an outgoing uplink communication originating from the UE 2312 towards the host computer 2316.

Example implementations, in accordance with an embodiment, of the UE, base station, and host computer discussed in the preceding paragraphs will now be described with reference to FIG. 24. In a communication system 2400, a host computer 2402 comprises hardware 2404 including a communication interface 2406 configured to set up and maintain a wired or wireless connection with an interface of a different communication device of the communication system 2400. The host computer 2402 further comprises processing circuitry 2408, which may have storage and/or processing capabilities. In particular, the processing circuitry 2408 may comprise one or more programmable processors, ASICs, FPGAs, or combinations of these (not shown) adapted to execute instructions. The host computer 2402 further comprises software 2410, which is stored in or accessible by the host computer 2402 and executable by the processing circuitry 2408. The software 2410 includes a host application 2412. The host application 2412 may be operable to provide a service to a remote user, such as a UE 2414 connecting via an OTT connection 2416 terminating at the UE 2414 and the host computer 2402. In providing the service to the remote user, the host application 2412 may provide user data which is transmitted using the OTT connection 2416.

The communication system 2400 further includes a base station 2418 provided in a telecommunication system and comprising hardware 2420 enabling it to communicate with the host computer 2402 and with the UE 2414. The hardware 2420 may include a communication interface 2422 for setting up and maintaining a wired or wireless connection with an interface of a different communication device of the communication system 2400, as well as a radio interface 2424 for setting up and maintaining at least a wireless connection 2426 with the UE 2414 located in a coverage area (not shown in FIG. 24) served by the base station 2418. The communication interface 2422 may be configured to facilitate a connection 2428 to the host computer 2402. The connection 2428 may be direct or it may pass through a core network (not shown in FIG. 24) of the telecommunication system and/or through one or more intermediate networks outside the telecommunication system. In the embodiment shown, the hardware 2420 of the base station 2418 further includes processing circuitry 2430, which may comprise one or more programmable processors, ASICs, FPGAs, or combinations of these (not shown) adapted to execute instructions. The base station 2418 further has software 2432 stored internally or accessible via an external connection.

The communication system 2400 further includes the UE 2414 already referred to. The UE's 2414 hardware 2434 may include a radio interface 2436 configured to set up and maintain a wireless connection 2426 with a base station serving a coverage area in which the UE 2414 is currently located. The hardware 2434 of the UE 2414 further includes processing circuitry 2438, which may comprise one or more programmable processors, ASICs, FPGAs, or combinations of these (not shown) adapted to execute instructions. The UE 2414 further comprises software 2440, which is stored in or accessible by the UE 2414 and executable by the processing circuitry 2438. The software 2440 includes a client application 2442. The client application 2442 may be operable to provide a service to a human or non-human user via the UE 2414, with the support of the host computer 2402. In the host computer 2402, the executing host application 2412 may communicate with the executing client application 2442 via the OTT connection 2416 terminating at the UE 2414 and the host computer 2402. In providing the service to the user, the client application 2442 may receive request data from the host application 2412 and provide user data in response to the request data. The OTT connection 2416 may transfer both the request data and the user data. The client application 2442 may interact with the user to generate the user data that it provides.

Figure 24:
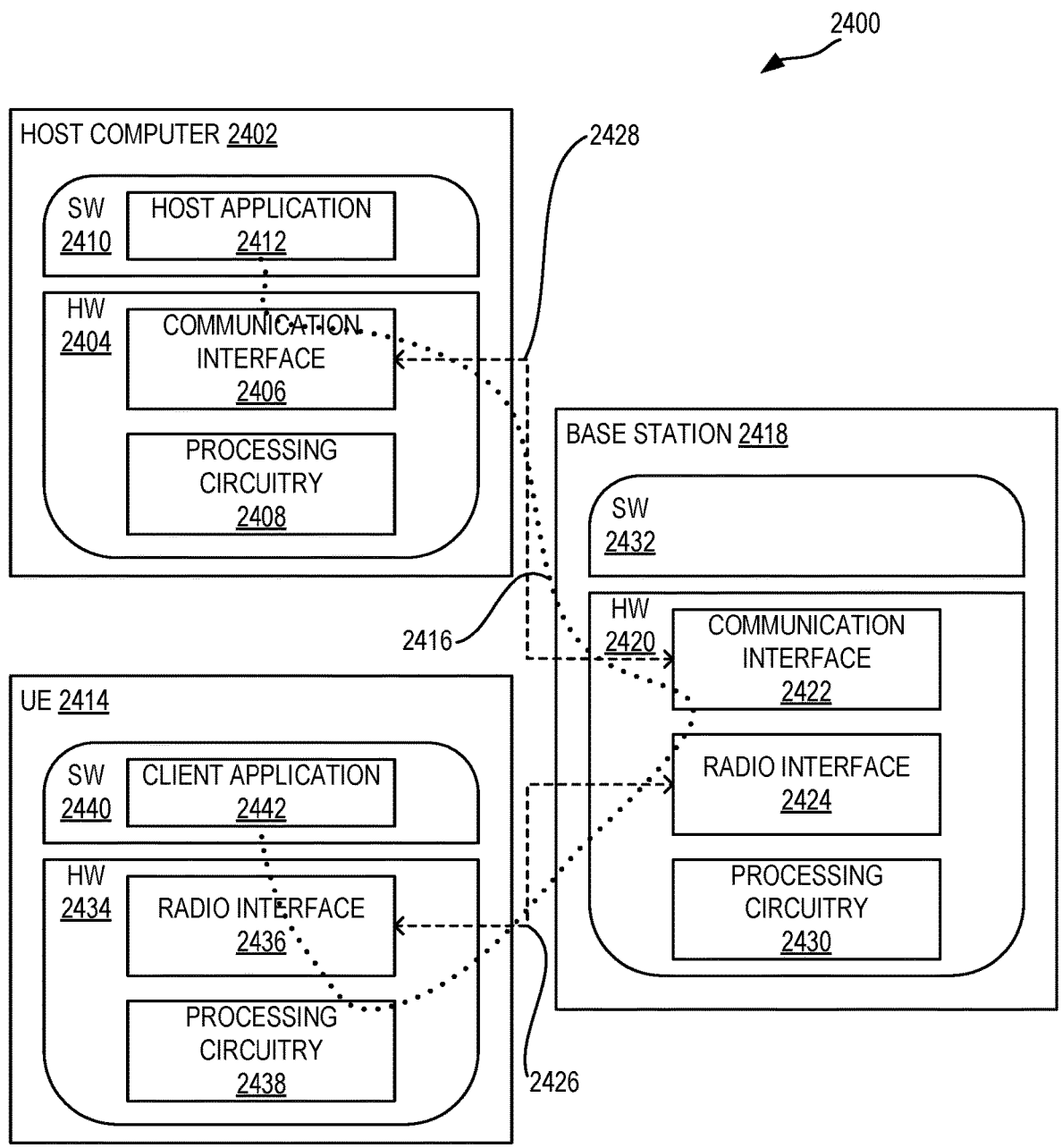
FIG. 24 illustrates example implementations in accordance with an embodiment of a UE, base station, and host computer according to some other embodiments of the present disclosure.

It is noted that the host computer 2402, the base station 2418, and the UE 2414 illustrated in FIG. 24 may be similar or identical to the host computer 2316, one of the base stations 2306A, 2306B, 2306C, and one of the UEs 2312, 2314 of FIG. 23, respectively. This is to say, the inner workings of these entities may be as shown in FIG. 24 and independently, the surrounding network topology may be that of FIG. 23.

In FIG. 24, the OTT connection 2416 has been drawn abstractly to illustrate the communication between the host computer 2402 and the UE 2414 via the base station 2418 without explicit reference to any intermediary devices and the precise routing of messages via these devices. The network infrastructure may determine the routing, which may be configured to hide from the UE 2414 or from the service provider operating the host computer 2402, or both. While the OTT connection 2416 is active, the network infrastructure may further take decisions by which it dynamically changes the routing (e.g., on the basis of load balancing consideration or reconfiguration of the network).

The wireless connection 2426 between the UE 2414 and the base station 2418 is in accordance with the teachings of the embodiments described throughout this disclosure. One or more of the various embodiments improve the performance of OTT services provided to the UE 2414 using the OTT connection 2416, in which the wireless connection 2426 forms the last segment.

A measurement procedure may be provided for the purpose of monitoring data rate, latency, and other factors on which the one or more embodiments improve. There may further be an optional network functionality for reconfiguring the OTT connection 2416 between the host computer 2402 and the UE 2414, in response to variations in the measurement results. The measurement procedure and/or the network functionality for reconfiguring the OTT connection 2416 may be implemented in the software 2410 and the hardware 2404 of the host computer 2402 or in the software 2440 and the hardware 2434 of the UE 2414, or both. In some embodiments, sensors (not shown) may be deployed in or in association with communication devices through which the OTT connection 2416 passes; the sensors may participate in the measurement procedure by supplying values of the monitored quantities exemplified above, or supplying values of other physical quantities from which the software 2410, 2440 may compute or estimate the monitored quantities. The reconfiguring of the OTT connection 2416 may include message format, retransmission settings, preferred routing, etc.; the reconfiguring need not affect the base station 2418, and it may be unknown or imperceptible to the base station 2418. Such procedures and functionalities may be known and practiced in the art. In certain embodiments, measurements may involve proprietary UE signaling facilitating the host computer 2402's measurements of throughput, propagation times, latency, and the like. The measurements may be implemented in that the software 2410 and 2440 causes messages to be transmitted, in particular empty or 'dummy' messages, using the OTT connection 2416 while it monitors propagation times, errors, etc.

Figures 25, 26:
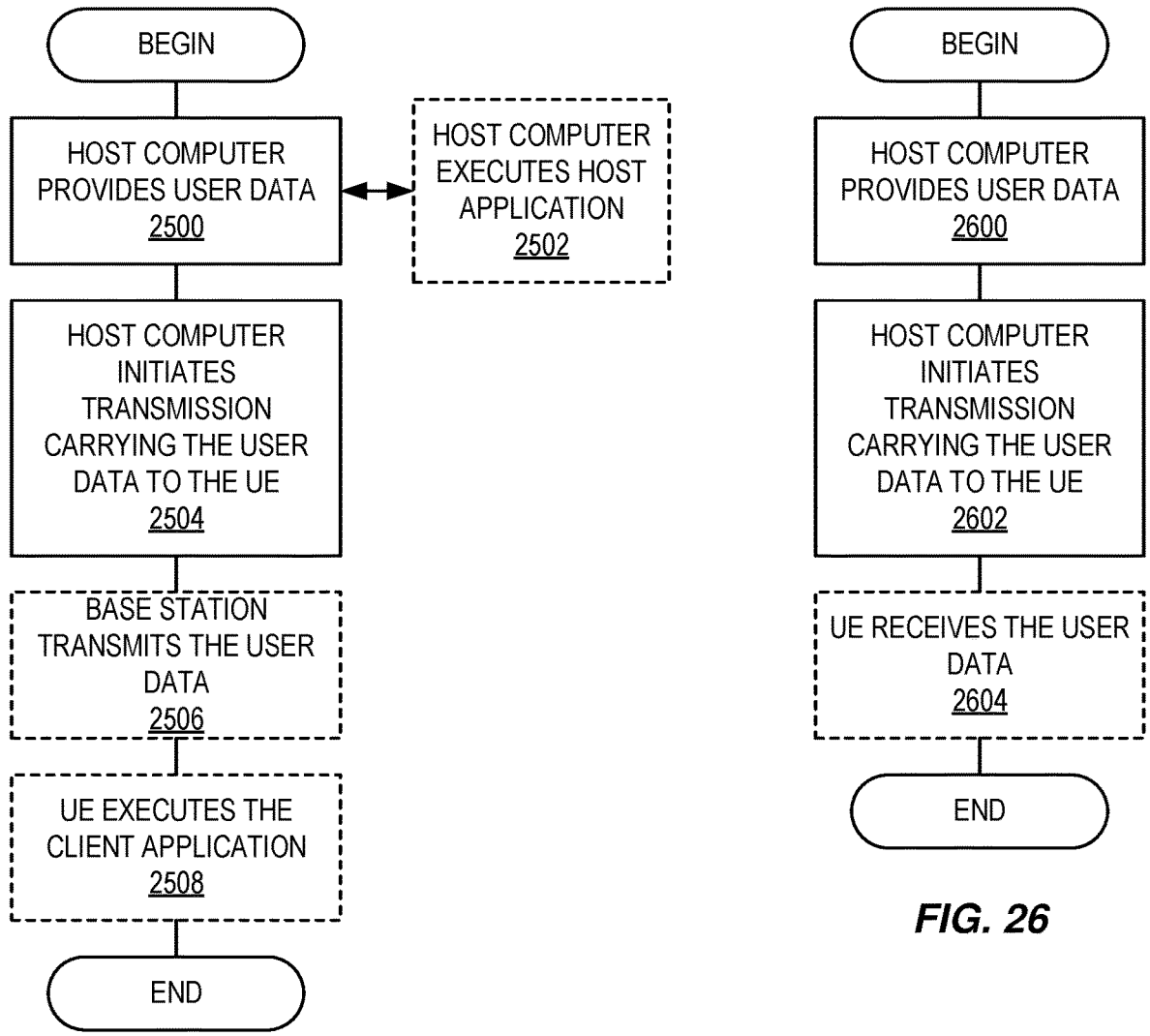
FIG. 25 is a flowchart illustrating a method implemented in a communication system, in accordance with one embodiment of the present disclosure.
FIG. 26 is a flowchart illustrating a method implemented in a communication system, in accordance with one other embodiment of the present disclosure.

FIG. 25 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 25 will be included in this section. In step 2500, the host computer provides user data. In sub-step 2502 (which may be optional) of step 2500, the host computer provides the user data by executing a host application. In step 2504, the host computer initiates a transmission carrying the user data to the UE. In step 2506 (which may be optional), the base station transmits to the UE the user data which was carried in the transmission that the host computer initiated, in accordance with the teachings of the embodiments described throughout this disclosure. In step 2508 (which may also be optional), the UE executes a client application associated with the host application executed by the host computer.

FIG. 26 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 26 will be included in this section. In step 2600 of the method, the host computer provides user data. In an optional sub-step (not shown) the host computer provides the user data by executing a host application. In step 2602, the host computer initiates a transmission carrying the user data to the UE. The transmission may pass via the base station, in accordance with the teachings of the embodiments described throughout this disclosure. In step 2604 (which may be optional), the UE receives the user data carried in the transmission.

Figures 27, 28:
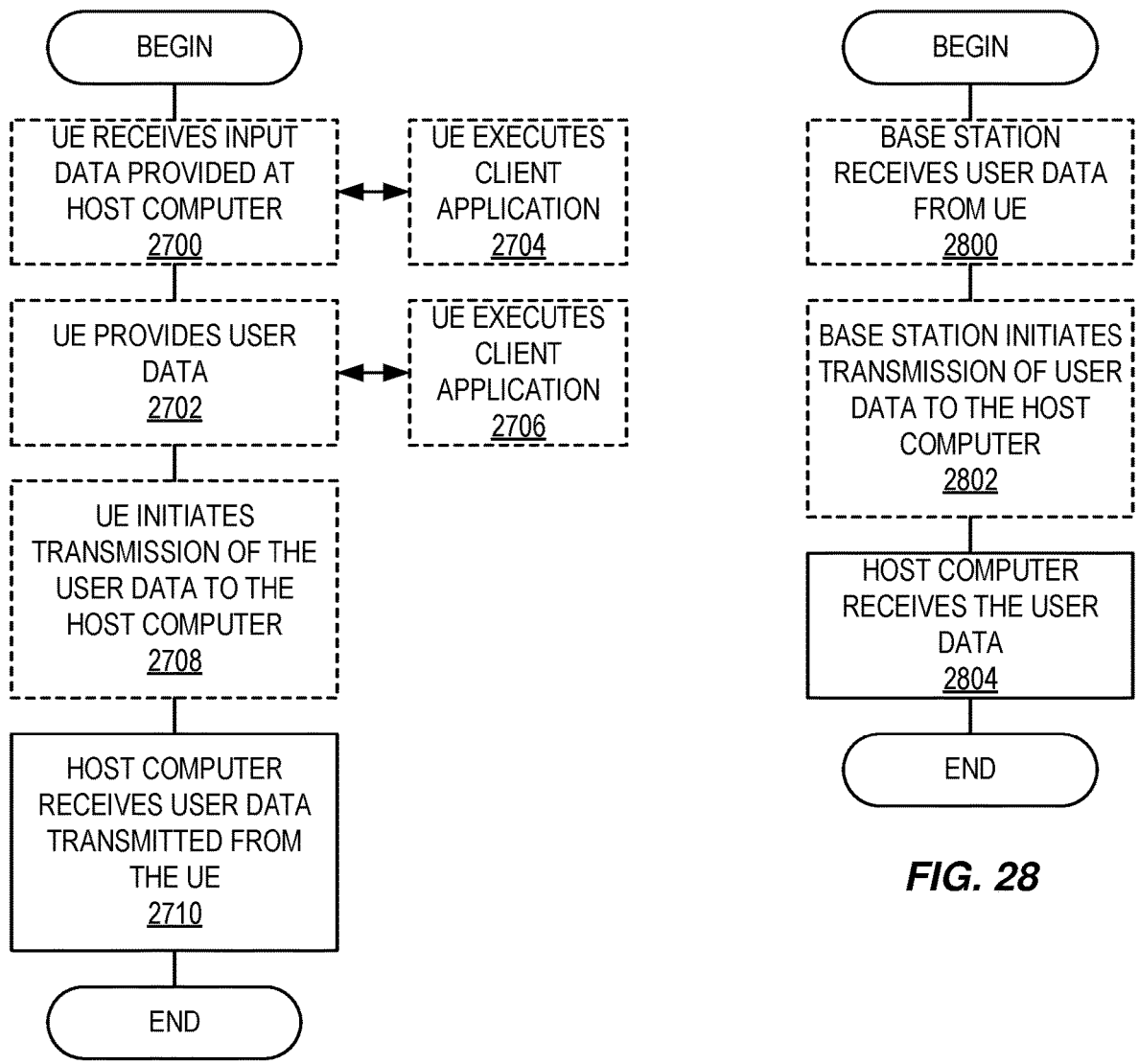
FIG. 27 is a flowchart illustrating a method implemented in a communication system, in accordance with one other embodiment of the present disclosure.
FIG. 28 is a flowchart illustrating a method implemented in a communication system, in accordance with one other embodiment of the present disclosure.

FIG. 27 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 27 will be included in this section. In step 2700 (which may be optional), the UE receives input data provided by the host computer. Additionally or alternatively, in step 2702, the UE provides user data. In sub-step 2704 (which may be optional) of step 2700, the UE provides the user data by executing a client application. In sub-step 2706 (which may be optional) of step 2702, the UE executes a client application which provides the user data in reaction to the received input data provided by the host computer. In providing the user data, the executed client application may further consider user input received from the user. Regardless of the specific manner in which the user data was provided, the UE initiates, in sub-step 2708 (which may be optional), transmission of the user data to the host computer. In step 2710 of the method, the host computer receives the user data transmitted from the UE, in accordance with the teachings of the embodiments described throughout this disclosure.

FIG. 28 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 28 will be included in this section. In step 2800 (which may be optional), in accordance with the teachings of the embodiments described throughout this disclosure, the base station receives user data from the UE. In step 2802 (which may be optional), the base station initiates transmission of the received user data to the host computer. In step 2804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless communication device comprising:
receiving, from a network node, information that configures the wireless communication device for a configured grant, CG, based Physical Uplink Shared Channel, PUSCH, transmission with PUSCH repetitions towards two or more transmissions/reception points, TRPs; and
performing the CG based PUSCH transmission with PUSCH repetitions towards the multiple TRPs in accordance with the received information.

Embodiment 2: The method of embodiment 1 wherein the CG based PUSCH transmission is a slot-based transmission (e.g., a Type A transmission).

Embodiment 3: The method of embodiment 1 wherein the CG based PUSCH transmission is a mini-slot based transmission (e.g., a Type B transmission).

Embodiment 4: The method of any of embodiments 1 to 3 wherein different TRPs from among the two or more TRPs are mapped to different CG PUSCH repetition occasions.

Embodiment 5: The method of any of embodiments 1 to 4 wherein RV allocation for the CG based PUSCH transmission is per TRP.

Embodiment 6: The method of any of embodiments 1 to 5 wherein the CG based PUSCH transmission uses per TRP based frequency hopping.

Embodiment 7: The method of any of embodiments 1 to 6 wherein the received information comprises per TRP configuration information comprising MCS, resource allocation, RV sequence, layer, and/or precoding configuration information.

Embodiment 8: The method of any of embodiments 1 to 7 further comprising sending, to the network node, information that indicates a capability of the wireless communication device for uplink panel switching time for CG beam updates.

Embodiment 9: The method of any of embodiments 1 to 8 wherein different TRPs from among the two or more TRPs are mapped to CG PUSCH repetition occasions in a cyclic manner (e.g., based on nominal PUSCH repetition occasions and UL/DL switch positions of the TRPs in two adjacent CG periods.

Embodiment 10: The method of any of embodiments 1 to 8 wherein different TRPs from among the two or more TRPs are mapped to CG PUSCH repetition occasions in a sequential manner (e.g., based on nominal PUSCH repetition occasions and UL/DL switch positions of the TRPs in two adjacent CG periods.

Embodiment 11: The method of any of embodiments 1 to 9 wherein the CG based PUSCH transmission uses per TRP based RV to CG PUSCH repetition occasion mapping in which either nominal or actual repetition occasions associated to each TRP are indexed independently.

Embodiment 12: The method of embodiment 11 wherein, for each nominal or actual repetition occasion, an index of the nominal or actual repetition occasion is mapped to a configured RV sequence.

Embodiment 13: The method of embodiment 11 or 12 wherein either a same RV sequence or different RV sequences are configured for each TRP from among the two or more TRPs.

Embodiment 14: The method of embodiment 11 or 12 wherein a same RV sequence is configured for each TRP from among the two or more TRPs, and a (e.g., different) RV offset is configured for each TRP from among the two or more TRPs.

Embodiment 15: The method of any of embodiments 1 to 14 wherein the CG based PUSCH transmission uses per TRP based frequency hopping in which frequency hopping is applied to PUSCH repetition occasions associated with each TRP independently.

Embodiment 16: The method of embodiment 15 wherein either nominal or actual PUSCH repetition occasions associated with each TRP are indexed independently, and an index of each nominal or actual PUSCH repetition occasion is used to determine a starting location (e.g., RB) (e.g., in frequency, e.g., in a frequency hopping pattern).

Embodiment 17: The method of any of embodiments 1 to 16 wherein the received information comprises information that separately configures for each TRP from among the two or more TRPs:
MCS;
TBS;
Frequency domain resource allocation;
Precoding;
Number of layers;
Antenna port;
Pathloss reference index;
Power control loop to use;
p0-PUSCH-Alpha;
a RV pattern or sequence to be applied;
SRS resource indicator; or
any two or more of (a)-(k).

Embodiment 18: The method of any of embodiments 1 to 17 wherein one or more CG PUSCH repetition occasions that collide with one or more dynamically scheduled PUSCHs are dropped.

Embodiment 19: The method of any of embodiments 1 to 17 wherein PUSCH repetitions (e.g., associated to a particular TRP) are associated to a same HARQ process ID is used, a particular one of the PUSCH repetitions collides with one or more dynamically scheduled PUSCHs, and, as a result, the particular one of the PUSCH repetitions occasions and all remaining PUSCH repetition occasions associated to the same HARQ ID are dropped.

Embodiment 20: The method of any of embodiments 1 to 19 wherein the CG is either RRC configured (e.g., type 1) or dynamically activated (e.g., type 2).

Embodiment 21: The method of any of embodiments 1 to 20 wherein the CG based PUSCH transmission comprises PUSCH repetitions towards the two or more TRPs in each of two or more transmission periods.

Embodiment 22: The method of any of embodiments 1 to 20 wherein the two or more TRPs are indicated by either two or more different SRS resource indicators, SRIs, or two or more UL TCI states comprises in the received information.

Embodiment 23: The method of any of embodiments 1 to 22 wherein a mapping between the CG PUSCH repetition occasions and the two or more TRPs changes in different time periods.

Embodiment 24: The method of any of embodiments 1 to 23 wherein, for each TRP from among the two or more TRPs:
  the TRP is associated with a subset of nominal repetitions;
  actual repetitions associated with the subset of nominal repetitions for each TRP are counted; and
  for an nth transmission occasion among the actual repetitions of the subset of nominal repetitions associated with the TRP, the nth transmission occasion is associated with an $(\mod(n-1,4)+1)^{th}$ value in a configured RV sequence for the TRP.

Embodiment 25: The method of any of embodiments 1 to 23 wherein, for each TRP from among the two or more TRPs:
  the TRP is associated with a subset of actual repetitions; and
  an nth transmission occasion among the actual repetitions is associated with an $(\mod(n-1,4)+1)^{th}$ value in a configured RV sequence for the TRP.

Embodiment 26: The method of embodiment 24 or 25 wherein the received information comprises information that configures different RV sequences for different TRPs.

Embodiment 27: The method of embodiment 24 or 25 wherein the received information comprises information that configures a same RV sequence and different RV offsets for the two or more TRPs.

Embodiment 28: The method of any of embodiments 1 to 27 wherein CG PUSCH transmission uses a same frequency hopping pattern for each TRP of the two or more TRPs.

Embodiment 29: The method of any of embodiments 1 to 27 wherein CG PUSCH transmission uses different frequency hopping patterns for at least two different TRPs from among the two or more TRPs.

Embodiment 30: The method of any of embodiments 1 to 29 wherein a same UCI is multiplexed with the PUSCH transmission on each of the two or more TRPs.

Embodiment 31: The method of any of embodiments 1 to 30 wherein the CG PUSCH transmission has a first priority and overlaps in time with a second CG PUSCH transmission with repetitions having a second priority, and a lower priority one of the CG PUSCH transmission and the second CG PUSCH transmission is cancelled before a start of a higher priority one of the CG PUSCH transmission and the second PUSCH transmission.

Embodiment 32: The method of any of embodiments 1 to 30 wherein the CG PUSCH transmission has a first priority and overlaps in time with a second CG PUSCH transmission with repetitions having a second priority, and repetitions of a lower priority one of the CG PUSCH transmission and the second CG PUSCH transmission that collide with repetitions of a higher priority one of the CG PUSCH transmission and the second PUSCH transmission are cancelled.

Embodiment 33: The method of any of embodiments 1 to 32 wherein the received information comprises information that updates one or more activated beams used by the wireless communication device (4120 for CG PUSCH transmission with repetitions, and the wireless communication device applies the updates only after a predefined or configured timer expires.

Embodiment 34: The method of embodiment 33 wherein the predefined or configured timer depends on a number of panels that the wireless communication device can support for uplink.

Embodiment 35: The method of any of the previous embodiments, further comprising:
  providing user data; and
  forwarding the user data to a host computer via the transmission.

Group B Embodiments

Embodiment 36: A method performed by a base station comprising:
  providing, to a wireless communication device, information that configures the wireless communication device for a configured grant, CG, based Physical Uplink Shared Channel, PUSCH, transmission with PUSCH repetitions towards two or more transmissions/reception points, TRPs.

Embodiment 37: The method of embodiment 36 wherein the CG based PUSCH transmission is a slot-based transmission (e.g., a Type A transmission).

Embodiment 38: The method of embodiment 36 wherein the CG based PUSCH transmission is a mini-slot based transmission (e.g., a Type B transmission).

Embodiment 39: The method of any of embodiments 36 to 38 wherein different TRPs from among the two or more TRPs are mapped to different CG PUSCH repetition occasions.

Embodiment 40: The method of any of embodiments 36 to 39 wherein RV allocation for the CG based PUSCH transmission is per TRP.

Embodiment 41: The method of any of embodiments 36 to 40 wherein the CG based PUSCH transmission uses per TRP based frequency hopping.

Embodiment 42: The method of any of embodiments 36 to 41 wherein the received information comprises per TRP configuration information comprising MCS, resource allocation, RV sequence, layer, and/or precoding configuration information.

Embodiment 43: The method of any of embodiments 36 to 42 further comprising sending, to the network node, information that indicates a capability of the wireless communication device for uplink panel switching time for CG beam updates.

Embodiment 44: The method of any of the previous embodiments, further comprising:
  obtaining user data; and
  forwarding the user data to a host computer or a wireless communication device.

Group C Embodiments

Embodiment 45: A wireless communication device comprising:
  processing circuitry configured to perform any of the steps of any of the Group A embodiments; and
  power supply circuitry configured to supply power to the wireless communication device.

Embodiment 46: A base station comprising:
  processing circuitry configured to perform any of the steps of any of the Group B embodiments; and
  power supply circuitry configured to supply power to the base station.

Embodiment 47: A User Equipment, UE, comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment 48: A communication system including a host computer comprising:
processing circuitry configured to provide user data; and
a communication interface configured to forward the user data to a cellular network for transmission to a User Equipment, UE;
wherein the cellular network comprises a base station having a radio interface and processing circuitry, the base station's processing circuitry configured to perform any of the steps of any of the Group B embodiments.

Embodiment 49: The communication system of the previous embodiment further including the base station.

Embodiment 50: The communication system of the previous 2 embodiments, further including the UE, wherein the UE is configured to communicate with the base station.

Embodiment 51: The communication system of the previous 3 embodiments, wherein:
the processing circuitry of the host computer is configured to execute a host application, thereby providing the user data; and
the UE comprises processing circuitry configured to execute a client application associated with the host application.

Embodiment 52: A method implemented in a communication system including a host computer, a base station, and a User Equipment, UE, the method comprising:
at the host computer, providing user data; and
at the host computer, initiating a transmission carrying the user data to the UE via a cellular network comprising the base station, wherein the base station performs any of the steps of any of the Group B embodiments.

Embodiment 53: The method of the previous embodiment, further comprising, at the base station, transmitting the user data.

Embodiment 54: The method of the previous 2 embodiments, wherein the user data is provided at the host computer by executing a host application, the method further comprising, at the UE, executing a client application associated with the host application.

Embodiment 55: A User Equipment, UE, configured to communicate with a base station, the UE comprising a radio interface and processing circuitry configured to perform the method of the previous 3 embodiments.

Embodiment 56: A communication system including a host computer comprising:
processing circuitry configured to provide user data; and
a communication interface configured to forward user data to a cellular network for transmission to a User Equipment, UE;
wherein the UE comprises a radio interface and processing circuitry, the UE's components configured to perform any of the steps of any of the Group A embodiments.

Embodiment 57: The communication system of the previous embodiment, wherein the cellular network further includes a base station configured to communicate with the UE.

Embodiment 58: The communication system of the previous 2 embodiments, wherein:
the processing circuitry of the host computer is configured to execute a host application, thereby providing the user data; and
the UE's processing circuitry is configured to execute a client application associated with the host application.

Embodiment 59: A method implemented in a communication system including a host computer, a base station, and a User Equipment, UE, the method comprising:
at the host computer, providing user data; and
at the host computer, initiating a transmission carrying the user data to the UE via a cellular network comprising the base station, wherein the UE performs any of the steps of any of the Group A embodiments.

Embodiment 60: The method of the previous embodiment, further comprising at the UE, receiving the user data from the base station.

Embodiment 61: A communication system including a host computer comprising:
communication interface configured to receive user data originating from a transmission from a User Equipment, UE, to a base station;
wherein the UE comprises a radio interface and processing circuitry, the UE's processing circuitry configured to perform any of the steps of any of the Group A embodiments.

Embodiment 62: The communication system of the previous embodiment, further including the UE.

Embodiment 63: The communication system of the previous 2 embodiments, further including the base station, wherein the base station comprises a radio interface configured to communicate with the UE and a communication interface configured to forward to the host computer the user data carried by a transmission from the UE to the base station.

Embodiment 64: The communication system of the previous 3 embodiments, wherein:
the processing circuitry of the host computer is configured to execute a host application; and
the UE's processing circuitry is configured to execute a client application associated with the host application, thereby providing the user data.

Embodiment 65: The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

Embodiment 66: A method implemented in a communication system including a host computer, a base station, and a User Equipment, UE, the method comprising:
at the host computer, receiving user data transmitted to the base station from the UE, wherein the UE performs any of the steps of any of the Group A embodiments.

Embodiment 67: The method of the previous embodiment, further comprising, at the UE, providing the user data to the base station.

Embodiment 68: The method of the previous 2 embodiments, further comprising:
- at the UE, executing a client application, thereby providing the user data to be transmitted; and
- at the host computer, executing a host application associated with the client application.

Embodiment 69: The method of the previous 3 embodiments, further comprising:
- at the UE, executing a client application; and
- at the UE, receiving input data to the client application, the input data being provided at the host computer by executing a host application associated with the client application;
- wherein the user data to be transmitted is provided by the client application in response to the input data.

Embodiment 70: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 71: The communication system of the previous embodiment further including the base station.

Embodiment 72: The communication system of the previous 2 embodiments, further including the UE, wherein the UE is configured to communicate with the base station.

Embodiment 73: The communication system of the previous 3 embodiments, wherein:
- the processing circuitry of the host computer is configured to execute a host application; and
- the UE is configured to execute a client application associated with the host application, thereby providing the user data to be received by the host computer.

Embodiment 74: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 75: The method of the previous embodiment, further comprising at the base station, receiving the user data from the UE.

Embodiment 76: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| 5GC | Fifth Generation Core |
| 5GS | Fifth Generation System |
| AF | Application Function |
| AMF | Access and Mobility Function |
| AN | Access Network |
| AP | Access Point |
| ASIC | Application Specific Integrated Circuit |
| AUSF | Authentication Server Function |
| CG | Configured Grant |
| CP-OFDM | Cyclic Prefix Orthogonal Frequency Division Multiplexing |
| CPU | Central Processing Unit |
| CSI-RS | Channel State Information Reference Signal |
| DCI | Downlink Control Information |
| DFT | Discrete Fourier Transform |
| DL | Downlink |
| DMRS | Demodulation Reference Signal |
| DN | Data Network |
| DSP | Digital Signal Processor |
| eNB | Enhanced or Evolved Node B |
| EPS | Evolved Packet System |
| E-UTRA | Evolved Universal Terrestrial Radio Access |
| FDD | Frequency Division Duplexing |
| FH | Frequency Hopping |
| FPGA | Field Programmable Gate Array |
| gNB | New Radio Base Station |
| gNB-CU | New Radio Base Station Central Unit |
| gNB-DU | New Radio Base Station Distributed Unit |
| HSS | Home Subscriber Server |
| IE | Information Element |
| IoT | Internet of Things |
| IP | Internet Protocol |
| LTE | Long Term Evolution |
| MME | Mobility Management Entity |
| MTC | Machine Type Communication |
| NEF | Network Exposure Function |
| NF | Network Function |
| NR | New Radio |
| NRF | Network Function Repository Function |
| NSSF | Network Slice Selection Function |
| OFDM | Orthogonal Frequency Division Multiplexing |
| OTT | Over-the-Top |
| PC | Personal Computer |
| PCF | Policy Control Function |
| PDCCH | Physical Downlink Control Channel |
| PDSCH | Physical Downlink Shared Channel |
| P-GW | Packet Data Network Gateway |
| PUSCH | Physical Uplink Shared Channel |
| QoS | Quality of Service |
| RAM | Random Access Memory |
| RAN | Radio Access Network |
| RB | Resource Block |
| RE | Resource Element |
| ROM | Read Only Memory |
| RRC | Radio Resource Control |
| RRH | Remote Radio Head |
| RS | Reference Signal |
| RTT | Round Trip Time |
| RV | Redundancy Version |
| SCEF | Service Capability Exposure Function |
| SMF | Session Management Function |
| SRS | Sounding Reference Signal |
| TB | Transport Block |
| TDD | Time Division Duplexing |
| TDRA | Time-Domain Resource Allocation |
| TRP | Transmission/Reception Point |
| UDM | Unified Data Management |
| UE | User Equipment |
| UL | Uplink |
| UPF | User Plane Function |
| URLLC | Ultra-Reliable Low-Latency Communication |

Those skilled in the art will recognize improvements and modifications to the embodiments of the present disclosure. All such improvements and modifications are considered within the scope of the concepts disclosed herein.

The invention claimed is:

1. A method performed by a wireless communication device comprising:
    receiving, from a network node, information that configures the wireless communication device for a Configured Grant, CG, based Physical Uplink Shared Channel, PUSCH, transmission with PUSCH repetitions towards a first and a second transmissions/reception points, TRPs, wherein the first and second TRPs are respectively associated with first and second Sounding Reference Signal, SRS, resource set; and
    performing the CG based PUSCH transmission with PUSCH repetitions towards the first and second TRPs at different PUSCH transmission occasions in accordance with the received information;
    wherein:
        the information that configures the wireless communication device further comprises:
            a single Redundancy Version, RV, sequence configured for both of the two TRPs, wherein the RV sequence consists of four RV values comprising RV1, RV2, RV3, and RV4; and
            a RV offset to be applied to the second TRP, wherein the RV offset comprises one of 0, 1, 2, or 3; and
        the RV sequence is to be applied to PUSCH repetitions towards the first TRP starting with RV1 in the RV sequence to the first PUSCH transmission occasion to the first TRP, and the RV sequence is to be applied to PUSCH repetitions towards the second TRP starting with a RV in the RV sequence indicated by the RV offset to the first PUSCH transmission occasion to the second TRP.

2. The method of claim 1, wherein the PUSCH repetitions are either type A repetitions that occur in consecutive slots or type B repetitions that occur in consecutive mini-slots, wherein a mini-slot comprises a number of consecutive symbols, wherein a transmission occasion for type A repetition starts at the first symbol in a slot and has a duration of 4 to 14 consecutive symbols, and wherein a transmission occasion for type B repetition starts from any symbol in a slot and has a duration of 1 to 14 consecutive symbols.

3. The method of claim 1, wherein:
    the PUSCH repetitions are nominal repetitions in case of type B repetition and a subset of the nominal repetitions are associated with each of the first TRP and the second TRP;
    actual repetitions associated with the subset of nominal repetitions for each TRP are counted starting from a first actual repetition of the actual repetitions; and
    for an nth transmission occasion among the actual repetitions of the subset of nominal repetitions associated with the second TRP, the nth transmission occasion is associated with an $(\mod(n-1+RV\_offset,4)+1)^{th}$ value in the single configured RV sequence, wherein n is a positive integer.

4. The method of claim 2, wherein the CG based PUSCH transmission is initiated at a transmission occasion of a PUSCH repetition associated with a RV value of 0.

5. The method of claim 1, wherein the CG based PUSCH transmission is a type A PUSCH repetition comprising transmission occasions in consecutive slots.

6. The method of claim 1, wherein the CG based PUSCH transmission is a type B mini-slot based PUSCH repetition comprising transmission occasions that occur (a) across two consecutive slots, or (b) in one slot.

7. The method of claim 1, wherein the first and second TRPs are mapped to different CG PUSCH repetition occasions.

8. The method of claim 1, wherein RV allocation for the CG based PUSCH transmission is per TRP.

9. The method of claim 1, wherein the CG based PUSCH transmission uses per TRP based frequency hopping.

10. The method of claim 1, wherein the received information comprises per TRP configuration information comprising one or more of:
    (a) SRS resource indicator;
    (b) pathloss reference signal index;
    (c) power control parameters: p0-PUSCH-Alpha;
    (d) Closed-loop power control loop index to use;
    (e) Number of layers and precoding configuration information;
    (f) RV sequence; or
    (g) any two or more of (a)-(e).

11. The method of claim 1, further comprising sending, to the network node, information that indicates a capability of the wireless communication device for uplink panel switching time for CG beam updates.

12. The method of claim 1, wherein the first and second TRPs are cyclically mapped to CG PUSCH repetition occasions, wherein odd numbered occasions are mapped to the first TRP and even numbered occasions are mapped to the second TRP, and wherein the repetitions are nominal repetitions in case of type B PUSCH repetition.

13. The method of claim 1, wherein the first and second TRPs are sequentially mapped to CG PUSCH repetition occasions, wherein $(4n-3,4n-2)^{th}$ occasions where n is a positive integer are mapped to the first TRP and remaining repetitions are mapped to the second TRP, and wherein the repetitions are nominal repetitions in case of type B PUSCH repetition.

14. The method of claim 1, wherein the CG based PUSCH transmission uses per TRP based RV to CG PUSCH repetition occasion mapping in which either (a) nominal repetition occasions associated to each TRP or (b) actual repetition occasions associated to each TRP are indexed independently.

15. The method of claim 14, wherein, for each nominal or actual repetition occasion, an index of the nominal or actual repetition occasion is mapped to a configured RV sequence.

16. The method of claim 14, wherein either (a) a same RV sequence or (b) different RV sequences are configured for each TRP from among the two TRPs.

17. The method of claim 1, wherein the CG based PUSCH transmission uses per TRP based frequency hopping in which a frequency hopping sequence is applied to PUSCH repetition occasions associated with each TRP independently.

18. The method of claim 17, wherein (a) either nominal repetition occasions associated with each TRP or (b) actual PUSCH repetition occasions associated with each TRP are indexed independently; and
    wherein an index of each nominal or actual PUSCH repetition occasion is used to determine a starting location.

19. The method of claim 18, wherein the starting location comprises a Resource Block, RB, of a frequency or a frequency hopping pattern.

20. The method of claim 1, wherein one or more CG PUSCH repetition occasions that collide with one or more dynamically scheduled PUSCHs are dropped.

21. The method of claim 1, wherein the CG is either RRC configured or dynamically activated.

22. The method of claim 21, wherein the CG comprises a RRC configured type 1 CG, and wherein the information that configures the wireless communication device comprises RRC parameters, wherein the RRC parameters further comprise:
  (a) two pathlossReferenceIndex parameters;
  (b) two srs_resourceIndicator parameters; and
  (c) two precodingAndNumberOfLayers parameters.

23. The method of claim 22, wherein:
  a first powerControlLoopToUse parameter of the two powerControlLoopToUse parameters and a first p0-PUSCH-Alpha parameter of the two p0-PUSCH-Alpha parameters are associated with the first SRS resource set; and
  a second powerControlLoopToUse parameter of the two powerControlLoopToUse parameters and a second p0-PUSCH-Alpha parameter of the two p0-PUSCH-Alpha parameters are associated with the second SRS resource set.

24. The method of claim 21, wherein the CG comprises a dynamically activated type 2 CG.

25. The method of claim 24, wherein, prior to performing the CG based PUSCH transmission, the method comprises receiving, from the network node, downlink control information, DCI, for activation of the CG based PUSCH transmission with PUSCH repetitions, wherein the DCI is indicative of (a) two SRS Resource Indicators, SRS RIs, and (b) two Transmit Precoding Matrix Indices (TPMI) in case of codebook based PUSCH.

26. The method of claim 25, wherein the DCI comprises a parameter that indicates, to the wireless communication device, to apply:
  (a) the first powerControlLoopToUse parameter;
  (b) the second powerControlLoopToUse parameter;
  (c) the first p0-PUSCH-Alpha parameter;
  (d) the second p0-PUSCH-Alpha parameter; or
  (e) any two or more of (a)-(e).

27. The method of claim 1, wherein the information that configures the wireless communication device comprises RRC parameters, wherein the RRC parameters comprise:
  two powerControlLoopToUse parameters; and
  two p0-PUSCH-Alpha parameters.

28. The method of claim 1, wherein:
  A DCI for a dynamic scheduled, DG, PUSCH transmission is further received via a Physical Downlink Control Channel, PDCCH; and
  wherein the PUSCH repetitions are associated to a different Hybrid Automatic Repeat Request, HARQ, process Identifier, ID, than the dynamically scheduled PUSCH, wherein a particular one or more of the PUSCH repetitions collide with the dynamically scheduled PUSCH, and wherein, as a result, the one or more PUSCH repetitions are dropped.

29. The method of claim 1, wherein the PUSCH repetitions are associated to a same HARQ process Identifier ID as one or more dynamically scheduled PUSCHs, wherein a particular one of the PUSCH repetitions collides with the one or more dynamically scheduled PUSCHs, and wherein, as a result, the particular one of the PUSCH repetitions occasions and all remaining PUSCH repetition occasions associated to the same HARQ ID are dropped.

30. The method of claim 1, wherein the CG based PUSCH transmission comprises PUSCH repetitions towards the first and second TRPs in each of two or more transmission periods.

31. The method of claim 1, wherein the first and second TRPs are indicated by either (a) two different SRS resource indicators, SRIs, or (b) two UL Transmission Configuration Indicator TCI states comprised in the received information.

32. The method of claim 1, wherein a mapping between the CG PUSCH repetition occasions and the first and second TRPs changes in different time periods.

33. The method of claim 1, wherein:
  each of the first and second TRPs is associated with a subset of nominal PUSCH repetitions;
  actual PUSCH repetitions associated with the subset of nominal PUSCH repetitions for each TRP are counted; and
  for an nth transmission occasion in which n is a positive integer among the actual repetitions of the subset of nominal repetitions associated with the first TRP, the nth transmission occasion is associated with an $(\mod(n-1,4)+1)^{th}$ RV value in a configured RV sequence for the TRP, wherein the RV sequence comprises 4 RV values {RV1, RV2, RV3, RV4}.

34. The method of claim 33, wherein the received information comprises information that configures different RV sequences for different TRPs.

35. The method of claim 33, wherein the received information comprises information that configures a same RV sequence and different RV offsets for the two TRPs.

36. The method of claim 1, wherein, for each TRP from among the two TRPs:
  the TRP is associated with a subset of actual repetitions; and
  an nth transmission occasion among the actual repetitions is associated with an $(\mod(n-1,4)+1)^{th}$ value in a configured RV sequence for the TRP.

37. The method of claim 1, wherein CG PUSCH transmission uses a same frequency hopping pattern for each TRP of the two TRPs.

38. The method of claim 1, wherein CG PUSCH transmission uses different frequency hopping patterns for the two TRPs.

39. The method of claim 1, wherein a same Uplink Control Information, UCI, is multiplexed with the PUSCH transmission towards each of the two TRPs.

40. The method of claim 1, wherein the CG PUSCH transmission has a first priority and overlaps in time with a second CG PUSCH transmission with repetitions having a second priority, and a lower priority one of the CG PUSCH transmission and the second CG PUSCH transmission is cancelled before a start of a higher priority one of the CG PUSCH transmission and the second PUSCH transmission.

41. The method of claim 1, wherein the CG PUSCH transmission has a first priority and overlaps in time with a second CG PUSCH transmission with repetitions having a second priority, and repetitions of a lower priority one of the CG PUSCH transmission and the second CG PUSCH transmission that collide with repetitions of a higher priority one of the CG PUSCH transmission and the second PUSCH transmission are cancelled.

42. The method of claim 1, wherein the received information comprises information that updates one or more activated beams used by the wireless communication device for CG PUSCH transmission with repetitions, and the wireless communication device applies the updates only after a predefined or configured timer expires.

43. The method of claim 42, wherein the predefined or configured timer is based at least in part on a reported value by the wireless communication device.

* * * * *